(12) United States Patent
Yoshida et al.

(10) Patent No.: US 9,409,377 B2
(45) Date of Patent: Aug. 9, 2016

(54) COMPOSITE MEMBRANE SUPPORT AND COMPOSITE MEMBRANE USING THE SAME

(75) Inventors: Minoru Yoshida, Tokyo (JP); Ikuo Ueno, Tokyo (JP); Norihisa Matsuo, Tokyo (JP); Hirotoshi Ishizuka, Kusatsu (JP); Hiroki Fujioka, Kusatsu (JP); Mieko Nishi, Kusatsu (JP)

(73) Assignees: ASAHI KASEI FIBERS CORPORATION, Osaka-Shi (JP); NITTO DENKO CORPORATION, Ibaraki-Shi (JP)

( * ) Notice: Subject to any disclaimer, the term of this patent is extended or adjusted under 35 U.S.C. 154(b) by 751 days.

(21) Appl. No.: 13/266,003

(22) PCT Filed: Apr. 28, 2010

(86) PCT No.: PCT/JP2010/057628
§ 371 (c)(1),
(2), (4) Date: Oct. 24, 2011

(87) PCT Pub. No.: WO2010/126113
PCT Pub. Date: Nov. 4, 2010

(65) Prior Publication Data
US 2012/0043272 A1     Feb. 23, 2012

(30) Foreign Application Priority Data

Apr. 30, 2009 (JP) .................. 2009-111441

(51) Int. Cl.
| | |
|---|---|
| *B41M 5/00* | (2006.01) |
| *B29C 70/08* | (2006.01) |
| *B32B 5/26* | (2006.01) |
| *B01D 63/10* | (2006.01) |
| *B01D 69/10* | (2006.01) |
| *B01D 69/12* | (2006.01) |
| *B32B 5/02* | (2006.01) |
| *D04H 1/559* | (2012.01) |
| *D04H 3/02* | (2006.01) |
| *D04H 3/14* | (2012.01) |

(52) U.S. Cl.
CPC . *B32B 5/26* (2013.01); *B01D 63/10* (2013.01); *B01D 69/10* (2013.01); *B01D 69/12* (2013.01);

(Continued)

(58) Field of Classification Search
USPC .......... 210/457, 489; 427/402; 428/219, 220; 442/335, 382
See application file for complete search history.

(56) References Cited

U.S. PATENT DOCUMENTS

| | | | |
|---|---|---|---|
| 2005/0130545 A1* | 6/2005 | Bansal et al. | ................. 442/415 |
| 2006/0043013 A1 | 3/2006 | Hiro et al. | |

(Continued)

FOREIGN PATENT DOCUMENTS

| | | |
|---|---|---|
| CN | 101318808 A | 12/2008 |
| JP | 2006-68644 | 3/2006 |

(Continued)

OTHER PUBLICATIONS

Supplementary European Search Report dated Mar. 12, 2012 issued in corresponding European Patent Application No. 10769811.0-1217.

(Continued)

*Primary Examiner* — Dirk Bass
(74) *Attorney, Agent, or Firm* — Finnegan, Henderson, Farabow, Garrett & Dunner, L.L.P.

(57) ABSTRACT

An object of the present invention is to provide a composite membrane support composed of a dry process thermoplastic resin filaments nonwoven fabric having a significantly high uniformity to enable formation of a porous layer free from strike-through or a defect such as pinhole at the film formation, producing no skin layer defect at the formation of a skin layer, and being excellent in the mechanical strength and dimensional stability at high temperatures, and a high-performance composite membrane and a composite membrane element each using the composite membrane support. The composite membrane support of the present invention is a laminate dry process thermoplastic resin filaments nonwoven fabric comprising three or more layers containing at least a meltblown fiber layer as an interlayer and spunbond fiber layers on both sides of the interlayer, wherein the average value of air flow resistance is from 2.0 to 30.0 kPa·s/m and the ratio between the average value and the standard deviation of air flow resistance is 0.6 or less.

11 Claims, 10 Drawing Sheets

(52) U.S. Cl.
CPC ............... *B32B 5/022* (2013.01); *D04H 1/559* (2013.01); *D04H 3/02* (2013.01); *D04H 3/14* (2013.01); *B32B 2250/03* (2013.01); *B32B 2250/20* (2013.01); *B32B 2250/40* (2013.01); *B32B 2255/02* (2013.01); *B32B 2255/26* (2013.01); *B32B 2255/28* (2013.01); *B32B 2262/0276* (2013.01); *B32B 2262/0284* (2013.01); *B32B 2305/026* (2013.01); *B32B 2305/20* (2013.01); *B32B 2305/28* (2013.01); *B32B 2307/726* (2013.01); *Y10T 442/609* (2015.04); *Y10T 442/66* (2015.04)

(56) References Cited

U.S. PATENT DOCUMENTS

| | | | |
|---|---|---|---|
| 2008/0138596 | A1 | 6/2008 | Yoshida et al. |
| 2008/0295951 | A1 | 12/2008 | Hiro et al. |
| 2010/0105273 | A1 | 4/2010 | Motomura et al. |
| 2010/0193428 | A1 | 8/2010 | Hane et al. |
| 2012/0045626 | A1 | 2/2012 | Inokuma et al. |

FOREIGN PATENT DOCUMENTS

| | | |
|---|---|---|
| JP | 2007-275691 | 10/2007 |
| JP | 2008-531279 | 8/2008 |
| JP | 2009-61373 | 3/2009 |
| TW | 1300009 B | 8/2008 |
| TW | 200848570 A | 12/2008 |
| WO | WO 2006/068100 | 6/2006 |
| WO | WO 2007/070688 | 6/2007 |
| WO | WO 2009/017086 | 2/2009 |
| WO | WO 2010/126109 A1 | 11/2010 |

OTHER PUBLICATIONS

Taiwan Patent Office, "Decision to Grant," and Search Report, Aug. 20, 2012, 4 pages.

English-language International Search Report from the Japanese Patent Office mailed Jul. 6, 2010, for International Application No. PCT/JP2010/057628.

Korean Patent Office, "Office Action," Feb. 19, 2013, 6 pages.

* cited by examiner

Fig.2
(a) 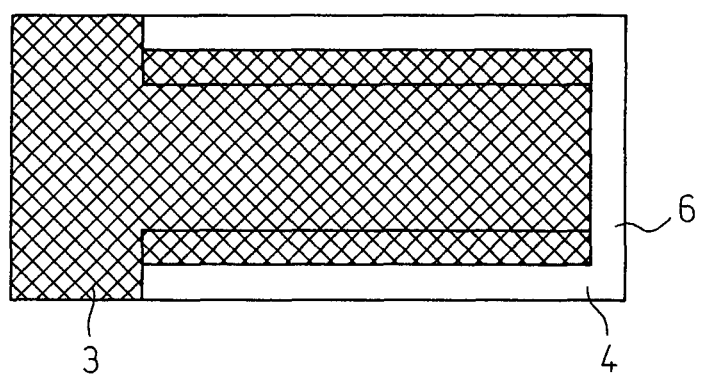
(b) 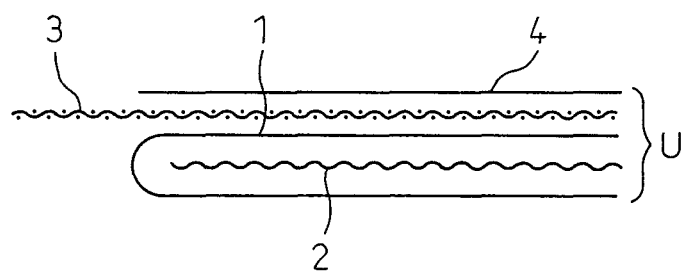
(c) 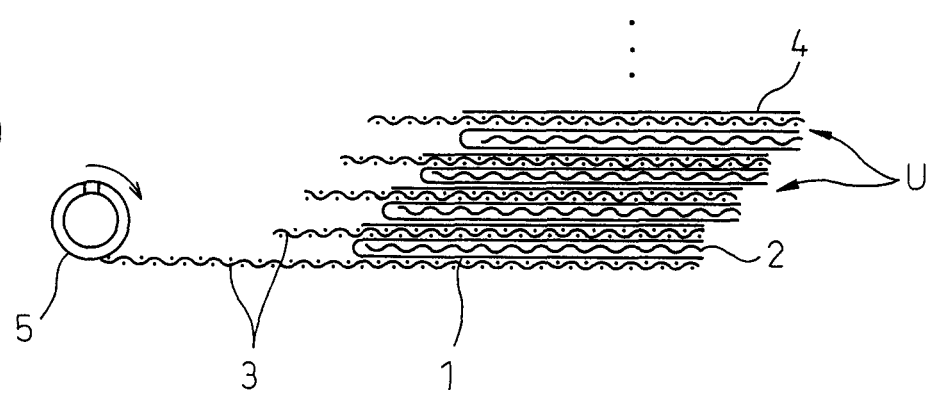

Fig.3
(a)
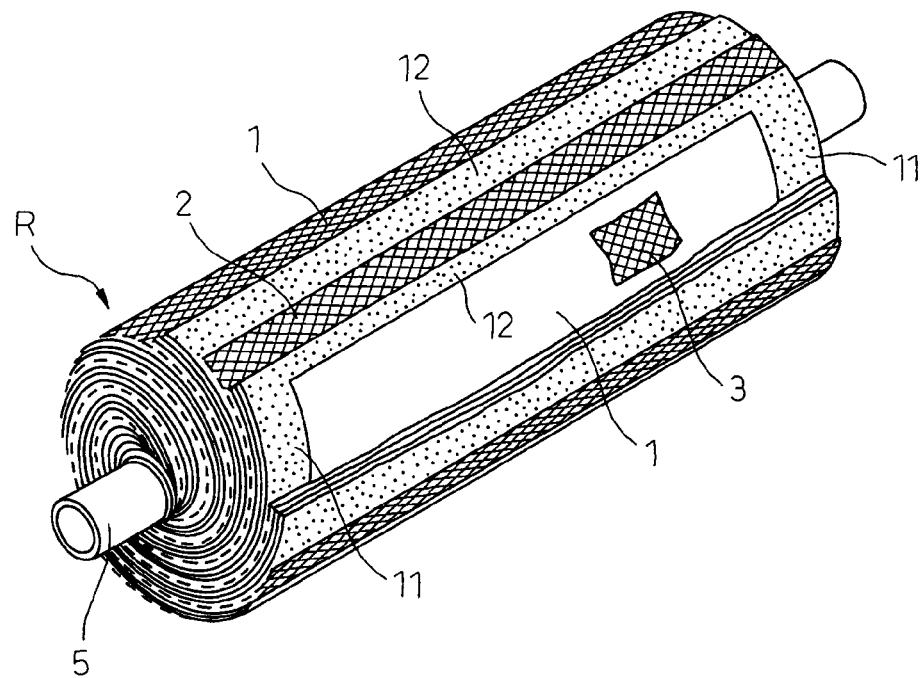
(b)
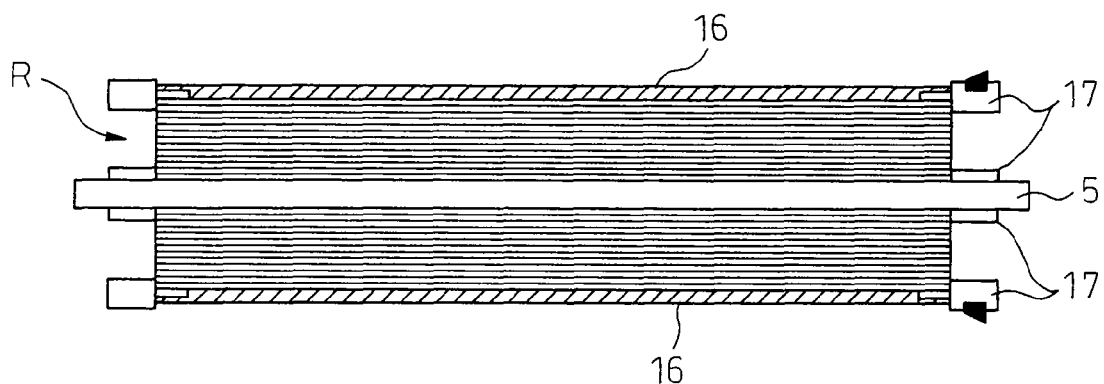

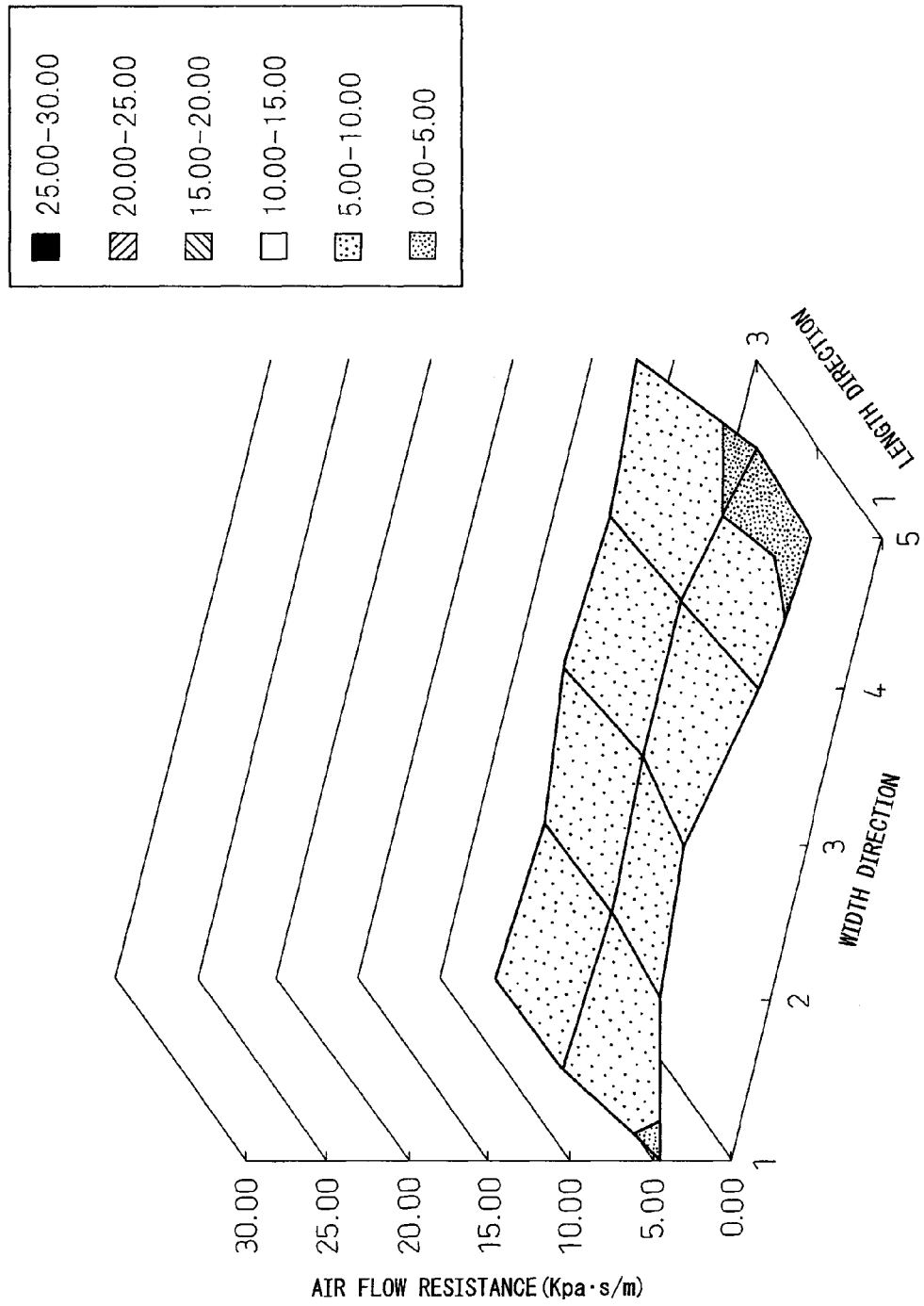

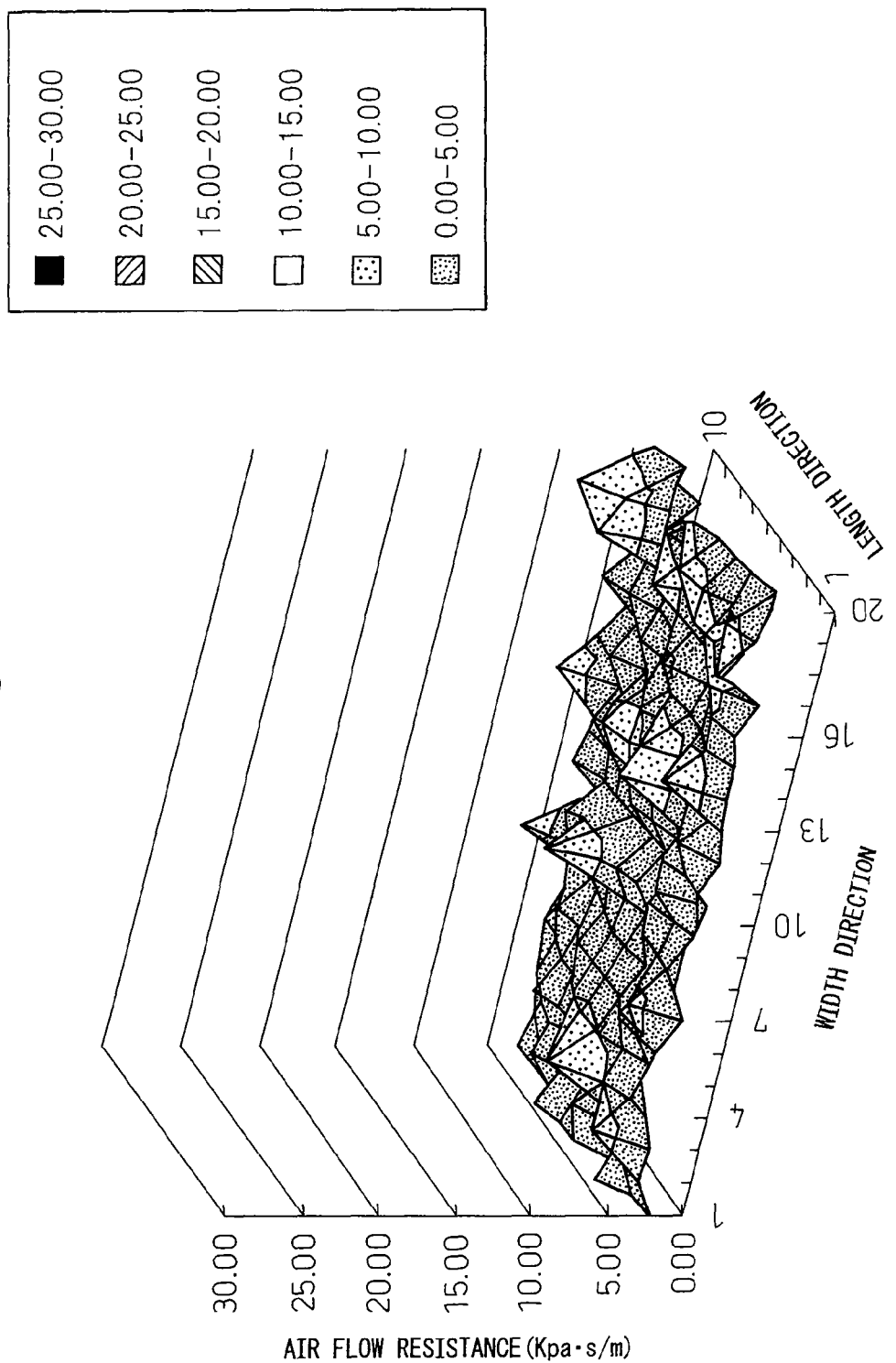

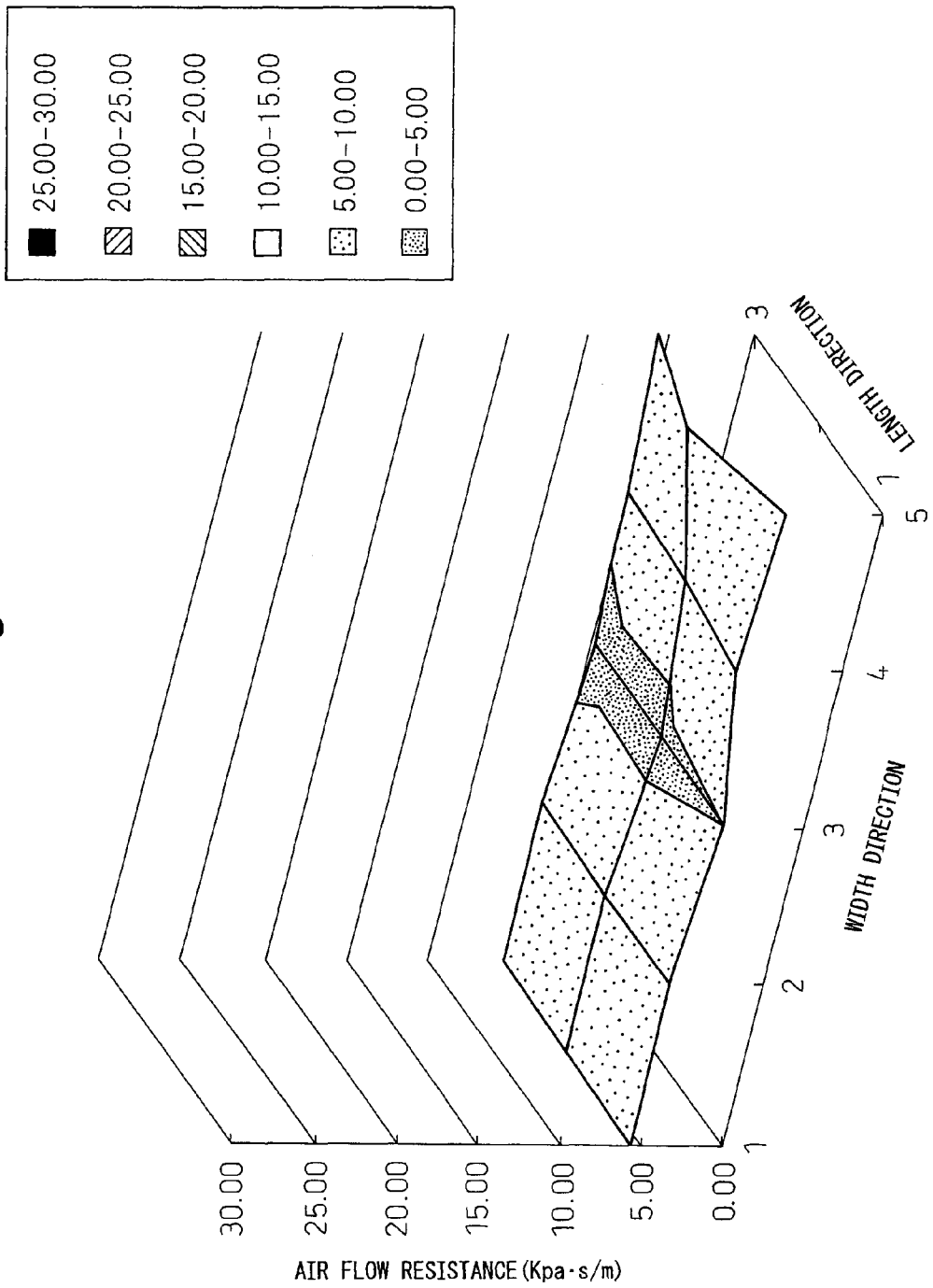

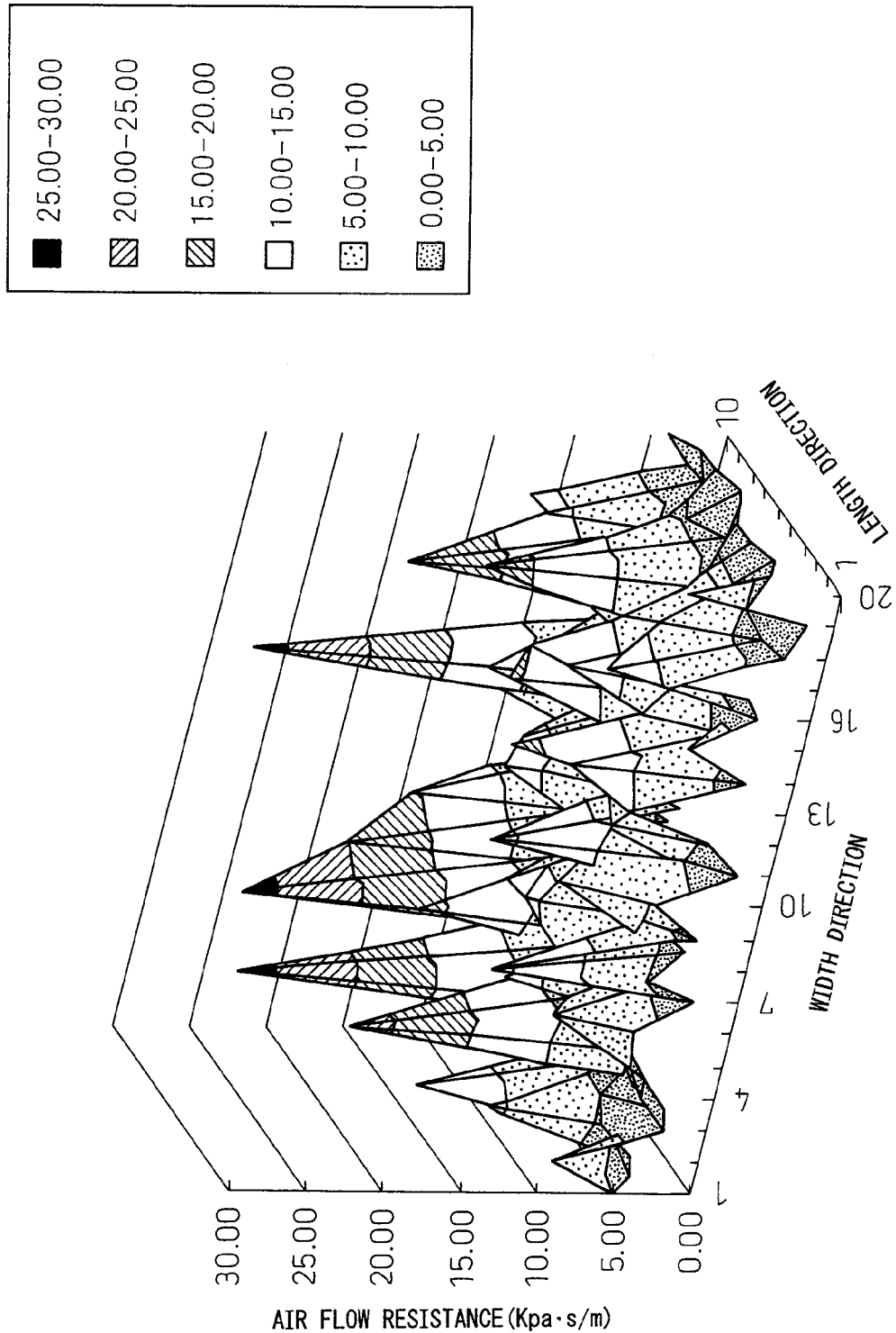

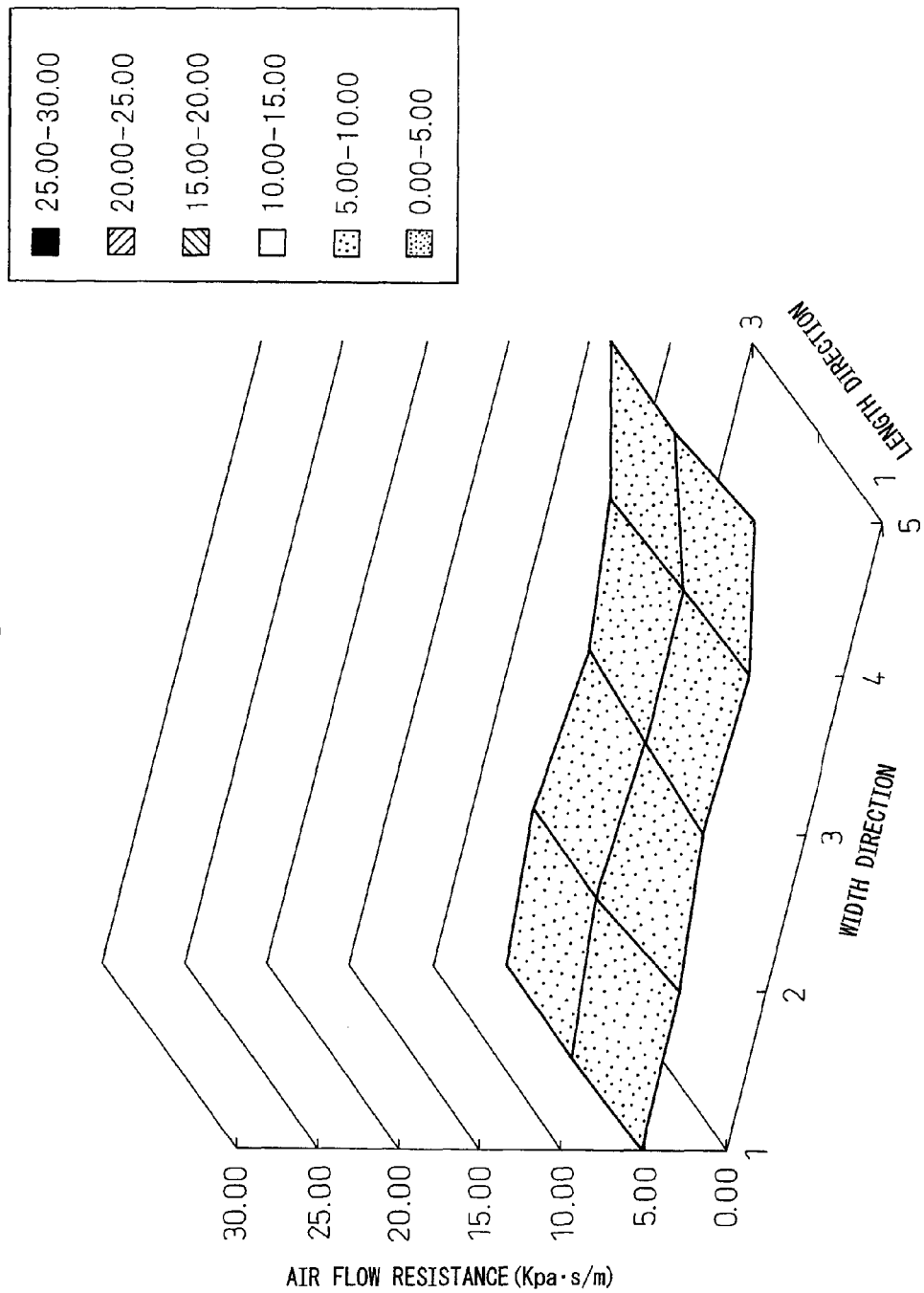

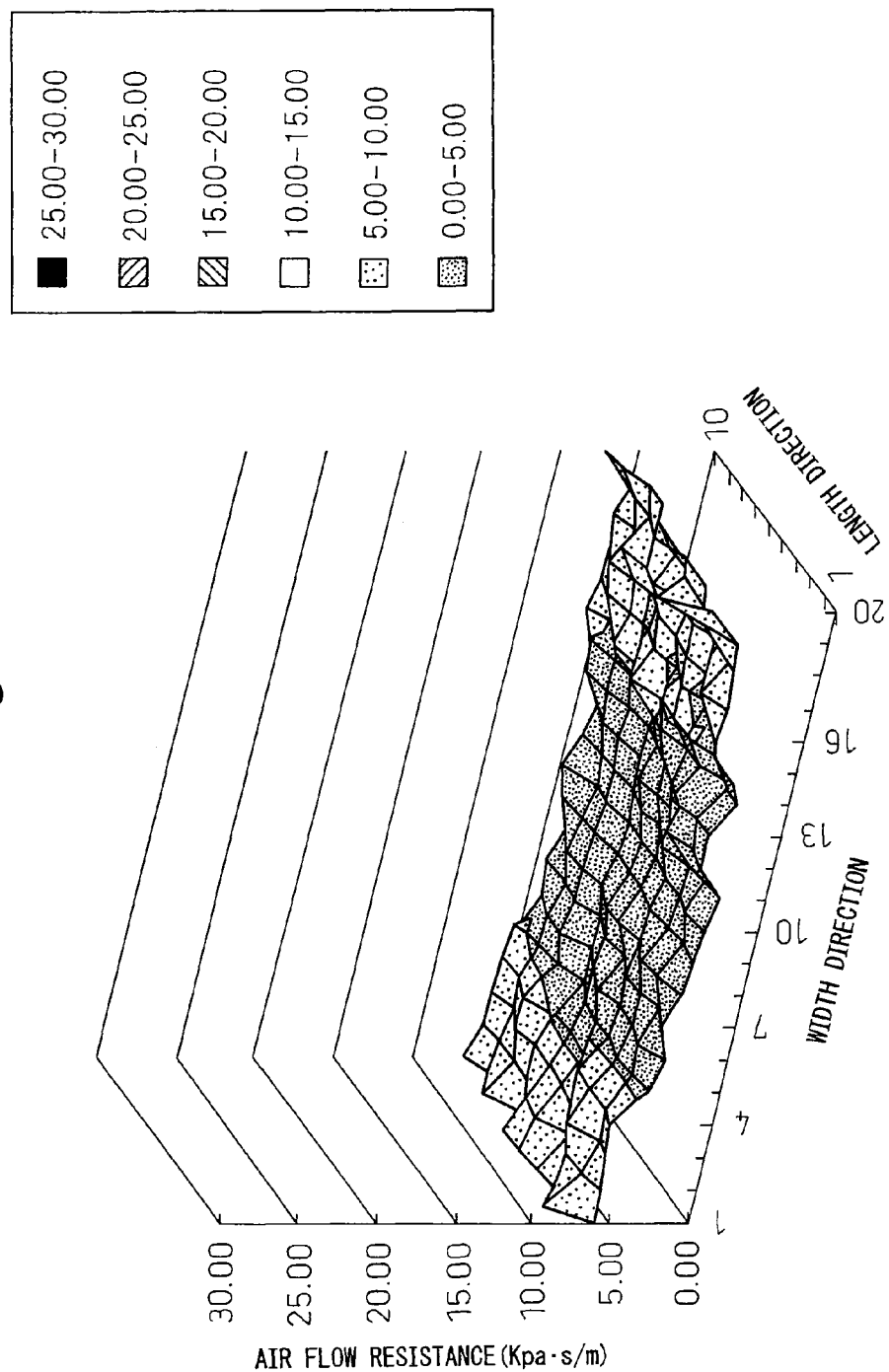

Fig.7
(A)
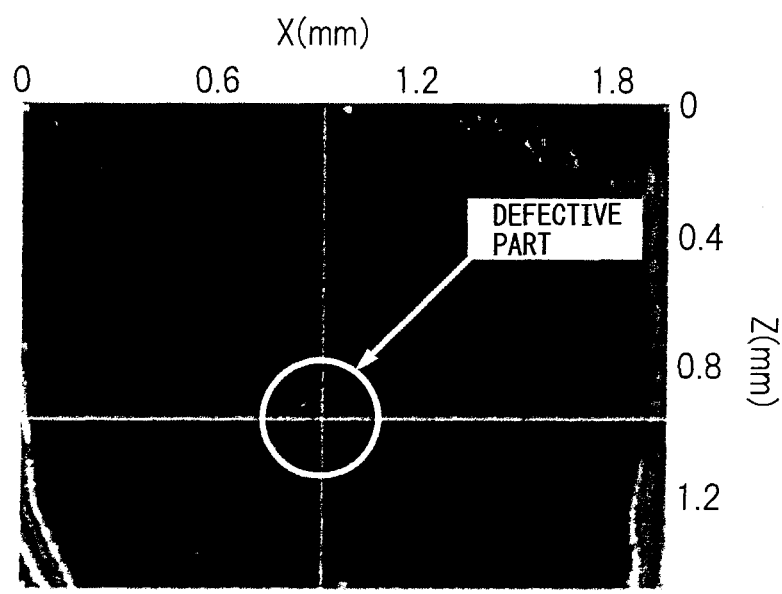
(B)
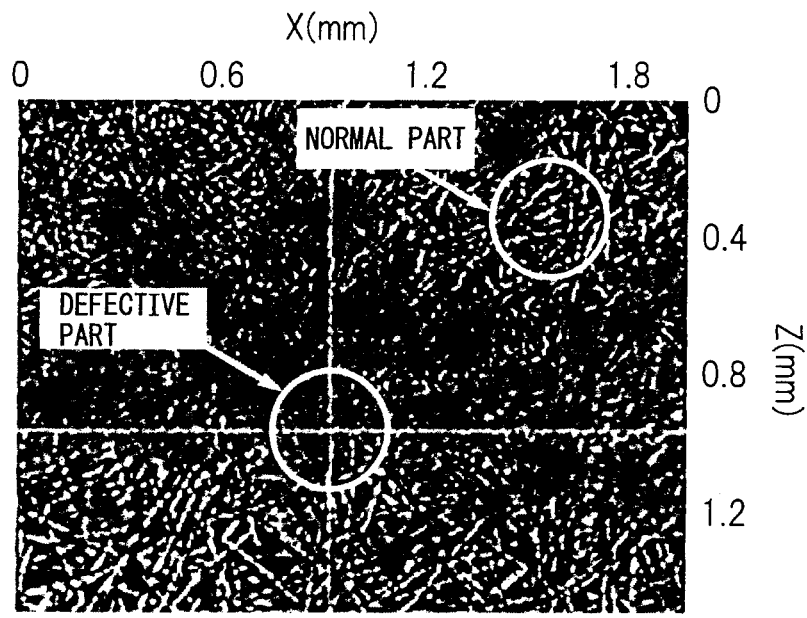

COMPOSITE MEMBRANE SUPPORT AND COMPOSITE MEMBRANE USING THE SAME

TECHNICAL FIELD

The present invention relates to a separation membrane support, a production method thereof, and a separation membrane and a separation Membrane element each using the separation membrane support. More specifically, the present invention relates to a composite membrane support comprising a laminate dry process thermoplastic resin filaments nonwoven fabric excellent in the mechanical strength and uniformity, which is suitably used for a composite membrane composed of a skin layer, a porous layer for holding it, and a support for reinforcing these layers, such as a reverse osmosis membrane, nanofiltration membrane, ultrafiltration membrane and gas separation membrane, a production method thereof, and a composite membrane and a composite membrane element each using the composite membrane support.

BACKGROUND ART

The membrane separation technology is being widely utilized for, for example, desalination of brine water such as river water and groundwater, desalination of seawater, production of ultrapure water in the semiconductor manufacturing industry, or reutilization of various industrial or domestic wastewaters, and in view of performance and cost, a polyamide-based composite membrane in the form of a flat membrane is generally used as the reverse osmosis membrane or nanofiltration membrane.

From the aspect of balance between the cost and the characteristics, a polyester-made nonwoven fabric is most often used as the support of the polyamide-based composite membrane, and a polysulfone is most commonly used as the porous material formed thereon. In the industrial production method of the polyamide composite membrane, a porous layer is first formed by a so-called wet process film-forming method where a film-forming solution prepared by dissolving a polysulfone in a solvent is cast on a support, solidified and deliquored with water, and on this polysulfone porous layer, a polyamide skin layer is formed by coating an aqueous polyfunctional amine solution and a polyfunctional acid chloride, allowing an interfacial polymerization to proceed, and the polyamide skin layer is cured and dried, whereby the polyamide composite membrane is continuously produced.

Also, as for the polyamide-based composite membrane in the form of a flat membrane, a spiral membrane element obtained by superimposing the membrane and a channel material, sealing on three sides with an adhesive resin, and winding these around a water collecting tube is most commonly used.

Accordingly, the support is required to have various characteristics and functions necessary at the production of a composite membrane and a composite membrane element, as well as to have not only a mechanical strength for reinforcing and supporting a membrane having a separation function but also characteristics such as bonding property and sealing property (sealability) of the bonded and sealed part of the element and resistance to chemicals during use.

That is, at the film formation of the porous layer, an appropriate density or air permeability not allowing generation of a defect such as pinhole and so-called strike-through of an excessively seeping film-forming solution, a uniformity thereof, and a surface smoothness are required. For example, if the density of the support is too low or not uniform, if a protrusion such as fiber-raising and extraneous material is present on the support surface, or if the surface unevenness is large, a pinhole, a crater-like recess or a defect called "Cut & Slit" as if the layer is cut or slit out with a knife may be produced in the porous layer, or a large number of air bubbles that are a latent defect may be generated at the interface between the support surface and the porous layer. If such a defect or a latent defect is produced in the porous layer, the aqueous amine solution coated at the film formation of the polyamide skin layer may be not uniformly held near the surface layer of the porous layer, and a defect may be produced in the skin layer or a dense skin layer may be not formed. Also, even if an apparently uniform skin layer is formed, the skin layer may be ruptured under pressure during use, and the desalination performance may be seriously impaired.

In the industrial film formation process of the polyamide skin layer, an interfacial polymerization is allowed to proceed on the porous layer surface in the course of conveying the support having a porous layer formed thereon under constant tension so as to prevent occurrence of curling or wrinkling, and then the support is usually taken up through a curing and drying step at 80 to 150° C. Therefore, mechanical strength at high temperatures is required.

If the mechanical strength at high temperatures is insufficient, the formed skin layer may be stretched together with the support, and a dense skin layer with high desalination performance may not be obtained, or the skin layer formed on the porous layer in a latent defective part attributable to the support may be locally ruptured.

Furthermore, at the production of a composite membrane element, appropriate density, air permeability and pore diameter, enabling an adhesive sealing resin to uniformly impregnate even the porous layer, are required.

On the other hand, in recent years, the worldwide increase in water demand and shortage of water due to depletion of water sources have given rise to an increasing need for water desalination by a membrane method and its effectiveness, and it is demanded to elevate the performance of the membrane itself, enhance the water permeability per unit volume of the membrane element, and reduce the production cost of the membrane element. In particular, the ratio of the support occupying in the material cost of the separation membrane is about ½ and highest and therefore, a thin and inexpensive support has been conventionally required.

International Publication No. 2006/068100 filed by the present inventors discloses a separation membrane support nonwoven fabric excellent in the property of preventing strike-through of a coating resin for separation membrane and having adequate heat resistance and high mechanical strength, which is produced by continuously spinning and laminating fabrics to form a three-layer structure of spunbond nonwoven fabric/meltblown nonwoven fabric/spunbond nonwoven fabric, and subjecting the structure to thermal bonding under specific conditions and then to calendering. This nonwoven fabric is less likely to cause fluffing giving rise to a membrane defect called Cut & Slit and sufficiently applicable as a support of a microfiltration membrane or an ultrafiltration membrane, nevertheless, when used as a support of a composite membrane, suffers from a problem that a local defect is readily produced and the desalination performance has dispersion.

As for the support using filaments nonwoven fabric, a separation membrane support consisting of at least two layers, where a low melting-point resin powder or a nonwoven fabric for bonding is disposed between a surface layer on which a membrane is formed, and a second layer in proximity to the surface layer, has been proposed in Japanese Unexamined Patent Publication No. 2007-275691, but softening of the low melting-point substance and in turn, strength reduction or dimensional change may occur at high temperatures in the curing and drying step at the film formation of a skin layer of the composite membrane. Also, the low melting-point resin powder or the nonwoven fabric for bonding may melt and this may inhibit uniform impregnation of the membrane with an adhesive sealing resin at the production of a spiral membrane element and impair the reliability of the sealed part.

Japanese Unexamined Patent Publication No. 2009-61373 has proposed to use, as the separation membrane support, a laminate nonwoven fabric that is composed of a filaments nonwoven fabric composed of a thermoplastic continuous filament. It is disclosed in this publication that the mechanical strength is increased and fluffing on the nonwoven fabric is reduced, by using a core-sheath type filaments nonwoven fabric containing a low melting-point component or using a low melting-point bonding substance between layers. However, due to melting and resinification of the low melting-point component, many locally-filmed sites are generated and the uniformity of the membrane is not satisfied. Furthermore, similarly to the above Japanese Unexamined Patent Publication No. 2007-275691, there is a problem of softening or melting of a low melting-point substance at high temperatures in the curing and drying step at the film formation of a skin layer of the composite membrane. A single-component spunbond laminate nonwoven fabric free from a low melting-point component is also disclosed. However, in the case of a single component, delamination is liable to occur, causing a problem in the handleability, and although relatively high strength (5% elongational stress) is exhibited at the initial elongation stage based on the tensile stress, when a stress larger than that is applied, respective layers are easily separated and sequentially broken stepwise according to the breaking stress of each layer, as a result, the entire nonwoven fabric is disadvantageously broken under a low stress. In addition, similarly to International Publication No. 2006/068100 filed by the present inventors, a single-component laminate nonwoven fabric, where a meltblown nonwoven fabric is disposed between two spunbond nonwoven fabric layers, is also described, but this fabric has the same problem as that in International Publication No. 2006/068100. Also, as the joining method, thermal pressure-contact by calendering using a normal heated metal roll and a non-heated elastic roll containing a silicon-based resin roll, which is performed for the purpose of suppressing fusion of fibers on the filaments nonwoven fabric surface and keeping the fiber shape, is disclosed. In this regard, although thermal pressure-contact in two stages is usually applied so that the heated roll can contact with both the front and back surfaces, in the case of a single component, thermal pressure-contact by calendering in the second stage cannot be sufficiently effected, and this causes a problem that fluffing due to delamination or weak bonding of surface fibers is liable to occur. This is considered to result because crystallization of the nonwoven fabric proceeds by the calendering in the first stage.

Also, International Publication No. 2007/070688 (Japanese Unexamined Patent Publication No. 2009-519818) discloses an SMS-type separation membrane support composed of a laminate nonwoven fabric obtained by using, as surface layers, a spunbond layer having a core-sheath structure where a low melting-point component is used for the sheath part and a high melting-point component is used for the core part, and disposing a meltblown layer as an interlayer. However, a low melting-point component is melt-bonded to produce a locally-filmed site, as a result, uniformity of coating is not satisfied and moreover, dimensional stability in high-temperature processing is lacking.

Similarly, International Publication No. 2009/017086 has proposed to use, as the membrane support, a laminate nonwoven fabric that is composed of a spunbond nonwoven fabric having a core-sheath structure where a low melting-point component is used for the sheath part and a high melting-point component is used for the core part, but this technique is not sufficient in view of resinification of a low melting-point component and dimensional stability in high-temperature processing. Also, a support nonwoven fabric obtained by thermally pressure-contacting a single-layer spunbond web with a pair of steel rolls is disclosed as a support nonwoven fabric composed of a PET single component, which does not contain a low melting-point component and exhibits a tensile strength and a surface fiber bonding property necessary as a membrane support. However, because of a singe layer, non-uniformity ascribable to dispersion of the basis weight of spunbond, and filming due to excessive pressure-contact in a local high basis-weight portion are readily generated, and thus, the nonwoven fabric is unsatisfactory.

PRIOR ART

Patent Document

Patent Document 1: International Publication No. 2006/068100

Patent Document 2: Japanese Unexamined Patent Publication No. 2007-275691

Patent Document 3: Japanese Unexamined Patent Publication No. 2009-61373

Patent Document 4: International Publication No. 2007/070688 (Japanese Unexamined Patent Publication No. 2009-519818)

Patent Document 5: International Publication No. 2009/017086

SUMMARY OF THE INVENTION

Problems to be Solved by the Invention

Accordingly, an object of the present invention is to provide a composite membrane support composed of a dry process thermoplastic resin filaments nonwoven fabric having a significantly high uniformity to enable formation of a porous layer free from a defect such as strike-through or pinhole at the film formation, producing no skin layer defect at the formation of a skin layer, and being excellent in the mechanical strength and dimensional stability at high temperatures, a production method thereof, and a high-performance composite membrane and a composite membrane element each using the composite membrane support.

In order to find the cause of local defect and dispersion of desalination performance of the composite membrane using a three-layer structure dry process nonwoven fabric obtained in International Publication No. 2006/068100, the present inventors have evaluated the air permeability dispersion by comparison between the three-layer structure dry process nonwoven fabric above and a wet nonwoven fabric used in a commercially available composite membrane element.

With respect to an area of 1 m in width (Cross direction)× 0.5 m in length (Machine direction), air permeability by the Frazier method (measurement range: 70 mm in diameter) generally used for the evaluation of air permeability of a nonwoven fabric was measured at 15 portions in total, i.e., at equally spaced 5 portions in the Cross direction and equally spaced 3 portions in the Machine direction, and the dispersion was examined. Also, in order to detect the local dispersion with good sensitivity, using an air permeation resistance meter according to the KES method which can measure a measurement area of $0.2 \, \pi cm^2$ (diameter: 8.9 mm), for the same area as in the measurement by the Frazier method, the air flow resistance was measured at 200 points in total, that is, at 20 portions in the Cross direction and 10 portions in the Machine direction, and the dispersion was examined (details of the KES method are described later). The air permeability by the Frazier method and the value of air flow resistance by the KES method can be converted by the following formula. Therefore, the air permeability was converted into the value of air flow resistance, and the value of air flow resistance was compared between both nonwoven fabrics.

$$\text{Frazier air permeability (cm}^3/\text{cm}^2\cdot\text{sec)}=12.5/\text{air flow resistance (kPa}\cdot\text{s/m)}$$

As a result, in terms of the value of air flow resistance converted from the Frazier method, as shown in FIGS. 5A and 6A, the three-layer structure dry process nonwoven fabric exhibited dispersion equal to that of the wet process nonwoven fabric, but in terms of the value of air flow resistance for a small area by the KES method, as shown in FIGS. 5B and 6B, the three-layer structure dry process nonwoven fabric was confirmed to exhibit very large local dispersion.

Furthermore, in order to more particularly examine the defective part of the composite membrane using the three-layer structure dry process nonwoven fabric, the fault structure of the defective part was observed by an X-ray CT scanner that is used for nondestructive inspection of industrial products. As a result, the porosity determined using the tomogram and image analysis suggested that, as shown in FIG. 7 and Table 3, in the defective part, the fault structure inside the nonwoven fabric near the interface with the porous layer is a dense structure compared with the normal part.

These results revealed that a portion having a locally high value of air flow resistance and a high density is closely related to the defect generation in the skin layer of the composite membrane.

That is, it is presumed that at the wet process film formation of a porous layer on a nonwoven fabric, in a portion having a locally high air flow resistance of the nonwoven fabric, the porous layer is formed in a state where an air bubble present near the interface between the film-forming solution and the nonwoven fabric surface is not allowed to escape to the nonwoven fabric layer side opposite the coated layer and stays in the vicinity of the coated layer surface, and a thin porous layer on the air bubble is stretched in the drying and curing step at the formation of a skin layer of the composite membrane and ruptured to work out to a skin layer defect.

Means to Solve the Problems

As a result of intensive studies on the above-described problems, the present inventors have found that in a thermoplastic resin filaments nonwoven fabric whose use as a composite membrane support has been heretofore considered to be difficult due to lack of uniformity, when a laminate web prepared by using a spunbond fiber layer for front and back layers and disposing a meltblown fiber layer in the central part is subjected to calendering by an elastic roll having a specific hardness under specific thermal pressure-contact conditions so as to give specific air flow resistance and air flow resistance distribution, the obtained laminate nonwoven fabric can have uniformity equal to that of a wet process nonwoven fabric which has been heretofore used as a composite membrane support, and exhibit high dimensional stability and high surface fiber bonding property. The present invention has been accomplished based on this finding.

The greatest characteristic of a thermoplastic resin filaments nonwoven fabric using the composite membrane support of the present invention is that a laminate web consisting of a spunbond fiber layer, a meltblown fiber layer and a spunbond fiber layer is rapidly cooled immediately after a thermal pressure-contact step is applied to one surface, for example the front surface, with an elastic roll having a hardness of D60 to D95 and a heated metal roll, and subsequently, the same calendering process is applied to another surface, for example the back surface, whereby all of (1) uniformity of air flow resistance, (2) dimensional stability at high temperatures, and (3) high surface fiber bonding property, which have been unachievable in a conventional dry process nonwoven fabric, can be satisfied at the same time, and a high-quality composite membrane can be formed.

That is, an elastic roll having a specific high hardness and a heated metal roll are thermally pressure-contacted with surfaces one by one of a laminate web consisting of a spunbond fiber layer, a meltblown fiber layer and a spunbond fiber layer, whereby even in the case of a single-component fabric in which thermal pressure-contact is difficult, the elastic roll can be deformed following the basis weight dispersion characteristic of a dry process nonwoven fabric while keeping a high pressure and can apply an even pressure onto the entire surface of the nonwoven fabric and thus, melting and filming of the high basis-weight portion is less likely to occur, so that significantly uniform pressure-contact on the entire surface with no shortage of thermal pressure-contact in the low basis-weight part can be realized.

Moreover, it is noteworthy that in the case of applying pressure-contact under heating to surfaces one by one in separate steps, when the heated roll is set to a high temperature for increasing the adhesive force in the central part, the fiber layer as the surface layer is melted to cause filming, or when the temperature of the heated roll is lowered to prevent the filming, the adhesive force between layers is low and sufficiently high strength is disadvantageously not obtained, but in the present invention, at the time of thermally pressure-contacting an elastic roll having a specific hardness and a heated metal roll with both surfaces one by one of the laminate web, the web is rapidly cooled immediately after one surface is thermally pressure-contacted, and subsequently, another surface is thermally pressure-contacted in the same manner, whereby the thermal pressure-contact of another surface by calendering in the second stage is very effectively applied and high bonding property can be obtained on both front and back surfaces. This is considered to result because the intermediate meltblown layer and the spunbond layer on the high-hardness elastic roll side which is a non-heated side are kept from crystallization due to heat history of calendering in the first stage.

That is, in a dry process filaments nonwoven fabric, high strength, dimensional stability, surface fiber bonding property and uniform air flow resistance in a micro-region can be achieved only by the synergistic effect of (1) the fact that the specific surface area of the meltblown fiber layer as the central layer is large and in turn, the bonding area is large; (2) the fact that the meltblown fiber layer as the central layer has low crystallinity compared with spunbond fibers on the front and back and therefore, is high in the thermal bonding property; (3) thermal bonding under a uniform and high pressure by a high-hardness elastic roll; and (4) suppression of crystallization in the spunbond layer on another surface and the meltblown layer as an interlayer, which is brought about thanks to rapid cooling immediately after calendering of one surface.

FIG. 1 schematically shows one example of the cross-section of a laminate nonwoven fabric used for the composite membrane support of the present invention. The composite membrane support of the present invention has a structure where while the spunbond fiber on the outermost surface that is contacted with the heated roll is flatly deformed, the fiber in the central part is little deformed and voids are present in the inside.

This laminate nonwoven fabric structure ensures enhanced integration with a coating film due to an anchor effect brought about by high impregnation with a coating solution and at the same time, exerts a high leak-preventing function by virtue of excellent impregnation with an adhesive for sealing. Furthermore, since an ultrafine fiber layer is present as the central layer, the effect of preventing a strike-through phenomenon of the coating solution is also high.

That is, when a porous layer is formed on this laminate dry process nonwoven fabric, strike-through of a film-forming solution does not occur, the surface smoothness is excellent, and a uniform film without a pinhole defect or unevenness is obtained; and moreover, when a skin layer is formed on the porous layer surface, a defectless composite membrane with excellent desalination function is obtained, and separation of the porous layer or rupture of the skin layer is not caused even by filtration under high pressure. Thus, it has been found that the laminate dry process nonwoven fabric above has very excellent characteristics as a composite membrane support, and the present invention has been completed.

Furthermore, according to the present invention, the fiber diameter and basis weight of the spunbond fiber layer on the front and back and the meltblown fiber layer as an interlayer are appropriately designed, and this has an excellent advantage that the function can be designed for each layer. That is, the functional design can be made, for example, to enhance the surface smoothness or liquid penetration in the front surface layer, enhance the air permeability or coating solution barrier property in the interlayer, and enhance the impregnation with an adhesive for sealing in the back surface layer, so that a support significantly effective for use in a composite membrane can be obtained.

The present invention is as follows.

1. A composite membrane support, which is a laminate dry process thermoplastic resin filaments nonwoven fabric comprising three or more layers containing at least a meltblown fiber layer as an interlayer and spunbond fiber layers on both sides of the interlayer, wherein the average value of air flow resistance is from 2.0 to 30.0 kPa·s/m and the ratio between the average value and the standard deviation of air flow resistance is 0.6 or less.

2. The composite membrane support as described in 1 above, wherein the fiber diameter of the meltblown fiber is from 0.5 to 10.0 μm.

3. The composite membrane support as described in 1 or 2 above, wherein the fiber diameter of the spunbond fiber is from 5 to 20 μm.

4. The composite membrane support as described in any one of 1 to 3 above, wherein the total basis weight of the laminate dry process thermoplastic resin filaments nonwoven fabric is from 40 to 130 g/m².

5. The composite membrane support as described in any one of 1 to 4 above, wherein the thickness of the laminate dry process thermoplastic resin filaments nonwoven fabric is from 50 to 150 μm.

6. The composite membrane support as described in any one of 1 to 5 above, wherein each of the meltblown fiber and the spunbond fiber is composed of a single-component fiber.

7. The composite membrane support as described in any one of 1 to 6 above, wherein each of the meltblown fiber and the spunbond fiber is formed of a polyester-based resin.

8. The composite membrane support as described in 7 above, wherein each of the meltblown fiber and the spunbond fiber is formed of polyethylene terephthalate.

9. A composite membrane obtained by forming a porous layer and a dense layer (skin layer) having a separation function, on the composite membrane support described in any one of 1 to 8 above.

10. The composite membrane as described in 9 above, wherein the porous layer is formed of a polysulfone-based material and the dense layer is formed of a polyamide-based material.

11. A spiral composite membrane element obtained by spirally winding the composite membrane described in 9 or 10 above, a feed-side channel material and a permeation-side channel material around the outer circumferential surface of a perforated hollow tube.

12. A method for producing a composite membrane, comprising forming a porous layer on at least one surface of the composite membrane support described in any one of 1 to 8, and further forming a dense layer on the surface.

Effects of the Invention

As described above, a high-performance composite membrane and a composite membrane element, having characteristics equal to those produced using a wet process nonwoven fabric, can be produced by using a dry process nonwoven fabric and a great cost down can be expected. Also, the composite membrane support of the present invention has non-conventional significantly uniform air permeability and liquid permeability despite a filaments nonwoven fabric of a laminate structure and ensures good impregnation of an element with an adhesive sealing resin and high reliability of the sealed part, so that this composite membrane support can be suitably used as a support not only in a composite film for water treatment, such as reverse osmosis membrane and nanofiltration membrane but also in a gas separation membrane, a pervaporation membrane, a vapor permeation film or the like. Furthermore, the composite membrane support of the present invention can be also used as a support of a normal microfiltration or ultrafiltration membrane.

BRIEF DESCRIPTION OF THE DRAWINGS

FIG. 2 is one example of the method for producing the spiral composite reverse osmosis membrane element of the present invention.

FIG. 3 is a view showing one example of the spiral composite reverse osmosis membrane element of the present invention; (a) is a partially cut perspective view of a cylindrical wound body, and (b) is a cross-sectional view of the element.

FIG. 4A is a view showing the distribution of air flow resistance converted from the Frazier air permeability of the composite membrane support obtained in Example 1.

FIG. 4B is a view showing the distribution of air flow resistance measured by the KES method of the composite membrane support obtained in Example 1.

FIG. 5A is a view showing the distribution of air flow resistance converted from the Frazier air permeability of the composite membrane support obtained in Comparative Example 1.

FIG. 5B is a view showing the distribution of air flow resistance measured by the KES method of the composite membrane support obtained in Comparative Example 1.

FIG. 6A is a view showing the distribution of air flow resistance converted from the Frazier air permeability of the composite membrane support obtained in Reference Example 1.

FIG. 6B is a view showing the distribution of air flow resistance measured by the KES method of the composite membrane support obtained in Reference Example 1.

FIG. 7 is an X-ray tomographic image when the defective part of the composite reverse osmosis membrane obtained in Comparative Example 1 is observed by a micro X-ray CT scanner, SKYSCAN 1172 (manufactured by SKYSCAN); (A) is the surface of the defective part, and (B) is the inside of the support at a depth of about 10 μm from the porous layer interface in the periphery of the defective part.

MODE FOR CARRYING OUT THE INVENTION

Figure 1:
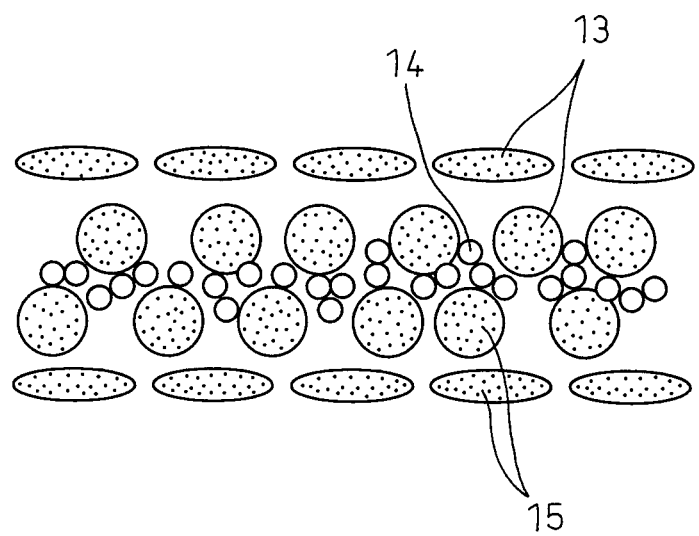
FIG. 1 is one example of the cross-sectional view of the laminate nonwoven fabric used for the composite membrane support of the present invention.

The present invention is described in detail below.
(Composite Membrane Support)
A dry process thermoplastic resin filaments nonwoven fabric as used in the present invention indicates a nonwoven fabric obtained by aerially dispersing and accumulating a continuous filament formed of a thermoplastic resin, unlike a method of dispersing and accumulating a short fiber (staple) in a liquid, such as sheet making method.

The thermoplastic resin filaments nonwoven fabric for use in the composite membrane support of the present invention is produced from a laminate thermoplastic resin filaments nonwoven fabric consisting of three or more layers, where at least a meltblown fiber layer is disposed as an interlayer and a spunbond fiber layer is disposed as front and back layers on both sides of the interlayer.

A spunbond nonwoven fabric having no fiber end because of a filaments is disposed as front and back layers, whereby a coating film defect ascribable to fiber fluff characteristic of a short fiber can be eliminated. A spunbond fiber having a fiber diameter of 5 to 20 μm is preferably used. The fiber diameter is more preferably from 9 to 14 μm, still more preferably from 10 to 13 μm. The basis weight of the spunbond fiber is, on each of the front and back, preferably from 10 to 80 g/m$^2$, more preferably from 19 to 46 g/m$^2$. The meltblown fiber layer used for the interlayer can prevent a so-called strike-through phenomenon where a film-forming solution excessively seeps out at the film formation of a porous layer, and at the same time, because of an ultrafine fiber, can create many contact points between fibers, so that an excellent bonding effect is brought out when performing the calendering of the present invention and high strength and dimensional stability at high temperatures can be obtained. The fiber diameter of the meltblown fiber layer is preferably from 0.5 to 10.0 μm, more preferably from 1.0 to 8.0 μm, still more preferably from 1.0 to 3.0 μm.

As the thermoplastic resin for use in the present invention, a resin having a melting point of 180° or more, such as polyester and polyamide, may be used, but in view of heat resistance and chemical resistance, a polyester-based resin is preferably used. Above all, polyethylene terephthalate is more preferably used in view of heat resistance and strength. Also, when the laminate nonwoven fabric containing a spunbond layer and a meltblown layer is entirely formed of a single component, high heat resistance can be obtained as compared with the case of using a low melting point component as an adhesive, and in this viewpoint, polyethylene terephthalate is in particular preferably used.

For example, when the calendering with a non-heated elastic roll having a hardness of D60 to D95 and a heated metal roll at 225 to 255° C. is performed in two stages, that is, one stage for one surface and another stage for another surface, and immediately after calendering of one surface, the web is rapidly cooled, the laminate nonwoven fabric for use in the present invention can be produced quite efficiently. Also, the production method of the laminate web of a spunbond fiber layer and a meltblown fiber layer, which is used in the present invention, is not particularly limited, but it is preferred to perform the calendering online after stacking a spunbond fiber layer/a meltblown fiber layer/a spunbond fiber layer on a net conveyor or apply the calendering as a separate step after temporary joining and stacking by a heated press roll.

The hardness of the elastic roll as used in the present invention is measured by the measurement method of D hardness in JIS K6253 (hereinafter simply indicated, for example, as D95). An elastic roll having a hardness of D60 or more is preferably used, because deformation of the elastic roll is small and a sufficiently high pressure necessary for thermal pressure-contact is obtained. As for the upper limit, an elastic roll having a hardness exceeding D95 may be considered to be effectively used, but at the present time, such an elastic roll is not present and actually, the hardness comes to deviate to the region of the metal roll, making it impossible to achieve the object of the present invention that the roll deforms according to the basis weight dispersion of the dry process nonwoven fabric and applies an even pressure on the entire surface of the nonwoven fabric. More specifically, the pressure is concentrated on the high basis-weight portion and is not applied to the low basis-weight portion, as a result, a portion locally fused to a high density and an insufficiently thermally pressure-contacted portion are produced. The portion contacted under an insufficient pressure is not only low in the bonding strength but also is likely to cause generation of a free fiber on the surface, giving rise to a defect in the coated film. Accordingly, an elastic roll of D95 or less is preferably used, because the roll can be deformed according to the basis weight dispersion of the dry process nonwoven fabric under a high pressure and an even pressure can be applied over the entire nonwoven fabric. The hardness is more preferably from D75 to D95, still more preferably from D80 to D95.

As the elastic roll, a resin roll or a paper roll can be used. In view of heat resistance, a material having a melting point or decomposition point of 350° C. or more is preferably used. Above all, a cellulose-based material using cotton or pulp, or a polyamide-based material such as aramid, is preferably used. A polyamide-based material is more preferred and in view of hardness and heat resistance, an aramid-based paper roll is still more preferred. The heating temperature of the metal roll is preferably set to a temperature from 5 to 40° C. lower than the meting point of the thermoplastic resin used for the composite membrane support.

In the present invention, following the calendering, heat setting of the nonwoven fabric may be performed by a heating treatment. The heat setting temperature is preferably from 80 to 230° C., more preferably from 120 to 200° C. From the standpoint of removing thermal strain of the fiber constituting the nonwoven fabric to enhance the dimensional stability at high temperatures and control the thermal-time constant-load elongation ratio, heat setting while tensioning the fabric across a plurality of heated rolls is preferably used. The draw ratio among a plurality of rolls is preferably set to be from 0.1 to 5%, more preferably from 0.1 to 3%, still more preferably from 0.3 to 2%.

The thermal-time constant-load elongation ratio in the Machine direction of the composite membrane support of the present invention is preferably 1.7% or less under the conditions of a load of 300 N/m and a temperature of 130° C., because the skin layer formed in the curing and drying step at the film formation of a polyamide skin layer is kept from being stretched together with the support or locally broken and a dense skin layer having high desalination performance is easily formed. The thermal-time constant-load elongation ratio is preferably 1.1% or less, more preferably 0.7% or less. In the case of −5.0% or more, curling due to shrinkage difference from the porous layer is less likely to occur, and this range is preferred.

Furthermore, the composite membrane support of the present invention, where a meltblown fiber layer is used for the interlayer and thermal pressure-contact is uniformly applied to the entire nonwoven fabric, has the same uniform air permeability as that of a wet process nonwoven fabric. That is, the average value of air flow resistance of the composite membrane support is from 2.0 to 30.0 kPa·s/m, preferably from 3.0 to 30.0 kPa·s/m, and the ratio between the average value and the standard deviation of air flow resistance is 0.6 or less. The air flow resistance may be adjusted by the fiber diameter of the fiber used and the calendering, but in the present invention, as long as the thickness, basis weight and apparent density of the support nonwoven fabric are set to a desired configuration, the air flow resistance can be arbitrarily controlled by changing the fiber diameter and basis weight of the ultrafine meltblown fiber layer used for the interlayer, and this control is very usefully practiced. That is, an air flow resistance over a wide range unachievable only by the density control based on the calendering conditions (temperature, pressure, heating time) can be controlled independently from the thickness or mechanical properties of the nonwoven fabric. Specifically, the air flow resistance can be effectively reduced by decreasing the meltblown fiber diameter or increasing the meltblown basis weight, or the air flow resistance can be reduced by increasing the meltblown fiber diameter and decreasing the meltblown basis weight. The air flow resistance can be raised by increasing the processing temperature, pressure and heating time of calendering and conversely, can be reduced by decreasing them. In the present invention, the meltblown basis weight is preferably from 3 to 27 g/m$^2$, and the fiber diameter is preferably from 0.5 to 10 μm. The meltblown basis weight is more preferably 3 to 25 g/m$^2$. When the average value of air flow resistance is 2.0 kPa·s/m or more, a strike-through phenomenon that the film-forming solution excessively seeps out is less likely occur at a practical film-forming speed at the film formation of a porous layer and this is preferred. On the other hand, when it is 30.0 kPa·s/m or less, air readily escapes to the back surface of the nonwoven fabric at the coating of the film-forming solution and remaining air bubble and generation of a pinhole or crater-like defect ascribable to the air bubble are advantageously reduced. The average value of air flow resistance is more preferably 23.0 kPa·s/m or less. Furthermore, when it is 9.0 kPa·s/m or less, the composite membrane can allow high impregnation with an adhesive resin and this advantageously makes it possible to increase the airtightness after the production of an element only with an adhesive resin and dispense with a step for enhancing the airtightness, such as heat seal. The average value of air flow resistance is still more preferably from 3.0 to 7.5 kPa·s/m.

The ratio between the average value and the standard deviation of air flow resistance is a value obtained by dividing the standard deviation by the average value and indicates the distribution based on the average value of air flow resistance. Generally, in the film forming step of a porous film, in order to avoid air carried over as an accompanying flow to the interface between the coating solution and the nonwoven fabric from not escaping to the nonwoven fabric side but remaining as an air bubble in the coating solution, the coating speed is slowed for a nonwoven fabric having high air flow resistance and hardly allowing escape of air in the accompanying flow, whereby the amount of air carried over is reduced. On the other hand, for a nonwoven fabric having low air flow resistance, the solidification time of the porous film from coating is shortened by increasing the coating speed, whereby the strike-through phenomenon of the coating solution is reduced. These may be arbitrarily selected in view of membrane performance or production performance, but in the case where the air flow resistance is low, the coating speed is high and the amount of air carried over as an accompanying flow is large. Therefore, more uniform air flow resistance is required. That is, when the ratio between the average value and the standard deviation of air flow resistance is 0.6 or less, an excessive strike-through phenomenon, a pinhole defect due to air bubble entrained, or entrainment of air bubble in the porous film can be reduced with a practical coating speed. On the other hand, if it exceeds 0.6, a defect due to pinhole or local strike-through caused by the air flow resistance dispersion is generated with a practical coating speed and this is not preferred. The ratio above is preferably 0.5 or less.

In order to obtain a composite membrane support having sufficient mechanical properties by using a thermoplastic resin filaments nonwoven fabric and adjust the ratio between the average value and the standard deviation of air flow resistance to 0.6 or less, it is preferred that a laminate nonwoven fabric produced by disposing a spunbond filaments layer as front and back layers and disposing a meltblown fiber layer in the central part is rapidly cooled after thermally pressure-contacting one surface with a high-hardness elastic roll having a hardness of D60 or more and a heated metal roll, and subsequently, the same calendering is applied to another surface.

That is, in the above-described method where an ultrafine meltblown fiber layer is disposed on the interlayer and an excessive heat is kept from being applied to the central part, sufficient mechanical properties can be developed and resistance uniformity unachievable by the conventional thermoplastic spunbond can be realized. On the other hand, if the elastic roll has a low hardness and sufficient pressure is not applied, the temperature or heating time must be increased so as to obtain necessary mechanical strength and even when a meltblown fiber layer is used for the interlayer, the uniformity of air flow resistance is impaired due to melting and filming, or opening resulting from shrinkage of the meltblown fiber. If the hardness of the elastic roll is less than D60, this tendency is liable to occur, and if the hardness is lower and A90 or less, the purpose cannot be achieved.

It is obvious that the index above is most preferably zero indicating a state of the air flow resistance being completely uniform, but considering the reduction in productivity when decreasing the basis weight dispersion of the dry process filaments nonwoven fabric, the index is preferably 0.05 or more, more preferably 0.1 or more.

The composite membrane support of the present invention is composed of a filaments nonwoven fabric having no fiber end and can be thermally pressure-contacted in a uniform and strong manner by the above-described production method, so that high-precision surface smoothing significantly reduced in surface free fibers or weakly pressure-contacted fibers, which may be raised by an external force such as rubbing, can be realized. Particularly, in calendering using an elastic roll, a surface pressure of 30 to 200 k/cm$^2$ is preferably used for the purpose of reducing the number of rubbed and raised fibers. The number of rubbed and raised fibers can be reduced by increasing the surface pressure. That is, the number of rubbed and raised fibers, of which measurement method is described in detail in Examples, is reduced and this is highly effective in forming a high-precision porous layer.

The basis weight of the composite membrane support of the present invention is preferably from 40 to 130 g/m$^2$, more preferably from 50 to 100 g/m$^2$. The thickness of the composite membrane support is preferably from 50 to 150 μm, more preferably from 60 to 120 μm.

(Composite Membrane and Spiral Composite Membrane Element)

The method for producing the composite membrane by using the composite membrane support of the present invention is not particularly limited, and a conventionally known method may be used. For example, a porous layer is first formed by a so-called nonsolvent phase separation method where a film-forming solution obtained by dissolving a polymer in a solvent is cast on the support surface layer, solidified with a nonsolvent such as water and then deliquored and washed, and on this porous layer, a skin layer having a separation function is formed, for example, by coating or interfacial polymerization, whereby a composite membrane such as reverse osmosis membrane or nanofiltration membrane is produced. The composite membrane of the present invention is almost free from a defect due to pinhole or local strike-through attributable to dispersion of the air flow resistance of the support and is an extremely high-performance composite film.

The material of the porous layer for use in the present invention is not particularly limited, but examples thereof include polysulfone, polyethersulfone, polyphenylsulfone, polyvinylidene fluoride, polyimide, polyacrylonitrile, an ethylene-vinyl alcohol copolymer, and cellulose acetate. In particular, a polysulfone-based material excellent in the mechanical strength, chemical resistance and heat resistance, such as polysulfone and polyethersulfone, is preferably used, and polysulfone is most preferably used.

As for the characteristics of a membrane where the composite membrane support of the present invention and a porous layer formed on the support are integrated, for example, an ultrafiltration membrane, the cut-off molecular weight is from 10,000 to 200,000 Daltons, preferably from 20,000 to 100,000 Daltons, and the permeate flow rate is, under 0.1 MPa, from 1 to 15 m$^3$/m$^2$·day, preferably from 3 to 10 m$^3$/m$^2$.day Incidentally, the cut-off molecular weight and the permeate flow rate are terms indicating membrane characteristics defined in JIS K 3802 (Terms of Membrane).

The skin layer is also not particularly limited, and a conventionally known skin layer can be used without any limitation. For example, as described above, this layer may be formed by interfacial polymerization. For example, a crosslinked polyamide obtained by condensation polymerization or the like of a polyfunctional acid halide and a polyfunctional amine is preferably used, and a crosslinked polyamide typically composed of metaphenylenediamine and trimesic acid chloride is more preferably used. A polyamide composite reverse osmosis membrane can be produced by the method disclosed, for example, in Japanese Unexamined Patent Publication Nos. 8-224452 and 9-253455.

The method for producing the spiral composite membrane element of the present invention by using the composite membrane of the present invention is also not particularly limited, and a conventionally known method may be used without any limitation. For example, the element can be produced by the method disclosed in Japanese Unexamined Patent Publication No. 2006-068644.

More specifically, as shown in FIGS. 2(a) to (c) and FIG. 3(a), the element can be produced through a step of spirally winding the composite film 1 of the present invention, a feed-side channel material 2, a permeation-side channel material 3 and an adhesive 4, in a stacked state, around the circumference of a perforated core tube 5 to form a cylindrical wound body R, and a step of, in order to prevent mixing of a feed-side fluid and a permeation-side fluid, coating a sealing resin 6 from the support side to impregnate sealing parts 11 at both ends and a sealing part 12 on the outer circumferential side of the composite membranes opposing through the permeation-side channel material 3, thereby effecting sealing.

The spiral composite reverse osmosis membrane element of the present invention uses a support having extremely high uniformity and allows good impregnation with a sealing resin and therefore, this is a highly reliable spiral composite reverse osmosis membrane element causing no occurrence of fine leak from the sealed part.

EXAMPLES

The present invention is described below by referring to Examples, but the present invention is not limited to these Examples.

The characteristic values evaluated in Examples and Comparative Examples were measured by the following methods.

(1) Basis Weight (g/m$^2$) of Nonwoven Fabric:

In accordance with the method specified in JIS-L-1906, a test piece of 20 cm in length (Cross direction)×25 cm in width (Machine direction) was sampled at 3 portions with respect to the sample width and measured for the weight, and the basis weight was determined by converting the average value of the weights measured into a weight per unit area.

(2) Thickness (μm) of Nonwoven Fabric:

In accordance with the method specified in JIS-L-1906, the sample was measured at 10 portions in the width direction under a contact pressure load of 100 g/cm$^2$, and the average value thereof was taken as the thickness. A thickness meter, No. 207, manufactured by PEACOCK was used. Since the minimum scale value was 0.01 mm, the thickness was read to the third decimal place and after averaging, expressed in μm as two significant figures.

(3) Tensile Strength (N/3 cm width) of Nonwoven Fabric:

In accordance with the method specified in JIS-L-1906, a sample strip of 3 cm (width)×20 cm (length) was sampled at 10 portions with respect to the sample width and measured for the tensile strength under the conditions of a chuck interval of 100 mm and a pulling speed of 200 mm/min, and the average value thereof was taken as the tensile strength of nonwoven fabric.

(4) Number of Rubbed and Raised Fibers (fibers/m$^2$) of Nonwoven Fabric:

A rubbing brush of 2.5 cm in width and 7 cm in length, where ester monofilaments having a fiber diameter of 200 μm, a length of 18 mm and a flexural rigidity of 0.3 gf·cm$^2$/filament were implanted at a density of 550 filaments/cm$^2$, was used, and the rubbing brush was vertically pressed against the nonwoven fabric under a pressure of 0.2 to 0.3 N/cm$^2$ and longitudinally rubbed once at a speed of 50 to 60 cm/s. The rubbing area was set to 1 m$^2$, and the number of raised fibers liberated from the surface after rubbing was measured with an eye and taken as the number of raised fibers per m$^2$.

(5) Air Permeability (cm$^3$/cm$^2$·sec) of Nonwoven Fabric:

In accordance with the Frazier method described in JIS-L-1096, the air permeability was measured in a range of 1 m (width)×50 cm (length) at 15 portions in total, i.e., at equally spaced 5 portions in the width direction and equally spaced 3 portions in the length direction, and the average value thereof was taken as the air permeability of nonwoven fabric (measurement area: 38 cm$^2$).

(6) Air Flow Resistance (kPa·s/m) of Nonwoven Fabric:

Using an air permeability tester KES-F8 (manufactured by Kato tech Co., Ltd.), the air flow resistance was measured in a range of 1 m (width)×50 cm (length) at 200 points in total, that is, at equally spaced 20 portions in the width direction and equally spaced 10 portions in the length direction, and the average value and standard deviation thereof were taken as the air flow resistance and the standard deviation of air flow resistance of nonwoven fabric (measurement area: 0.2 πcm$^2$, diameter: 8.9 mm). In the equipment for evaluation, the result is usually displayed as an integration value by automatically measuring the air flow resistance on each of the front surface and the back surface of the sample, but in the case where the air flow resistance was high, the integration value was calculated by manually measuring each of the front surface and the back surface.

Incidentally, the air flow resistance and the air permeability by the Frazier method described in (5) are in the relationship of the following formula and can be mutually converted.

Frazier air permeability (cm$^3$/cm$^2$·sec)=12.5/air flow resistance (kPa·s/m)

(7) Thermal-Time Constant-Load Elongation Ratio of Nonwoven Fabric:

A test piece of 10 cm in width×30 cm in length (Cross direction×Machine direction) was collected as samples from equally spaced 3 portions in the width direction. A longitudinal marking of 80 mm was applied to the center of the sample, and the initial length was measured by a microcaliper (minimum scale value: 0.01 mm). Subsequently, a heat treatment of 130° C.×3 minutes was performed in a state of a 3-kg load being applied in the Machine direction with a grip length of 14 cm, and the load was swiftly removed. The sample was allowed to cool to room temperature, and the length of the marking portion was measured by a microcaliper. The thermal-time constant-load elongation ratio was calculated according to the following formula, and the average value of three portion in the width direction was determined.

Thermal-time constant-load elongation ratio (%)= [(length after treatment−initial length)/initial length]×100

(8) Adhesive Resin Impregnation of Composite Membrane:

A polyol-blended resin and an isocyanate-blended resin of a two-component mixed urethane adhesive resin (produced by H. B. Fuller) generally used by one skilled in the art as an adhesive sealing resin for a spiral membrane element were blended in a predetermined ratio and mixed with stirring at room temperature for 1 minute, and 4 g of this mixed adhesive resin was coated on the support side of a 10 cm-square composite membrane. A composite membrane in the same dimension was stacked thereon by arranging the support side to contact with the adhesive resin, and the adhesive resin was cured by leaving these membranes to stand for about 12 hours at room temperature in a state of a 400 g load being applied on the stacked composite membrane through a plastic plate, whereby a sample for evaluation of adhesive resin impregnation was produced. In the obtained sample of evaluation of adhesive resin impregnation, the impregnated portion appears as a semitransparent gray color, and the non-impregnated portion appears as an opaque white-to-light yellow color that is an original color of the composite membrane.

The obtained sample for evaluation of adhesive resin impregnation was photographed by a digital camera to take almost the entire sample, and the obtained image was digitized by a commercially available image processing software (for example, Adobe PhotoShop). The resin-impregnated portion and the non-impregnated portion were distinguished as a black color and a white color, respectively, and after determining the area of each portion, the adhesive resin impregnation degree was determined according to the following formula:

Adhesive resin impregnation degree (%)=[area of impregnated portion/(area of impregnated portion+area of non-impregnated portion)]×100

(9) Flat Membrane Performance of Composite Reverse Osmosis Membrane:

A sample of 75 mm in diameter (effective membrane area: 3.3×10$^{-3}$ m$^2$) was collected from three portions, that is, left side, center and right side, of the composite reverse osmosis membrane having a width of 1 m and evaluated for the performance by a circulating flow-type flat membrane test cell under the following conditions.

Feed solution: an aqueous sodium chloride solution (pH: 6.5)
Concentration of feed solution: 1,500 ppm
Temperature of feed solution: 25° C.
Pressure: 1.5 MPa
Circulating flow rate: 5 L/min (a) Rejection Ratio (Rej.):

Concentrations of feed solution and permeated solution sampled in the performance evaluation above were measured by a conductance meter, and the rejection ratio was calculated according to the following formula:

Rejection ratio (%)=[(concentration of feed solution−concentration of permeated solution)/concentration of feed solution]×100

(b) Permeate Flow Rate (Flux):

The amount of permeated solution sampled for a predetermined time was measured and after determining the amount of permeated solution per minute, the permeate flow rate was calculated according to the following formula:

Permeate flow rate (m$^3$/m$^2$·day)=(60×24×F×10$^{-6}$)/A [F: amount of permeated solution (ml/min), A: area (m$^2$) of membrane].

(10) Performance of Spiral Composite Reverse Osmosis Membrane Element:

The performance was evaluated by an element evaluation apparatus under the following conditions.

Feed solution: an aqueous sodium chloride solution (pH: 6.5)
Concentration of feed solution: 500 ppm
Temperature of feed solution: 25° C.
Pressure: 0.7 MPa
Circulating flow rate: 20 L/min (a) Rejection Ratio (Rej.):

Concentrations of feed solution, concentrated solution and permeated solution sampled in the performance evaluation above were measured by a conductance meter, and the rejection ratio was calculated according to the following formula:

Rejection ratio (%)=[(Cf−Cp)/Cf]×100

[Cf: (concentration of feed solution−concentration of concentrated solution)/2, Cp: concentration of permeated solution].

(b) Permeate Flow Rate (Flux):

The amount of permeated solution per minute was measured, and the permeate flow rate was calculated according to the following formula:

Permeate flow rate (m$^3$/day)=60×24×F×10$^{-3}$

[F: amount of permeated solution (L/min)].

Example 1

(Production of Composite Membrane Support)

A thermoplastic resin filaments web having a fiber diameter of 11 μm and a basis weight of 31.3 g/m$^2$ was produced as a front surface layer (composite membrane solution coating surface) on a collection net by using polyethylene terephthalate as a thermoplastic resin by a spunbond method of extruding a filament group on a moving net surface at a spinning temperature of 300° C. and spinning the filaments at a spinning speed of 4,000 m/min. On the thermoplastic resin filaments web produced above by the spunbond method, a meltblown fiber layer having an average fiber diameter of 1.6 μm and a basis weight of 7.4 g/m$^2$ was blown as an interlayer by using polyethylene terephthalate by a meltblown method of spinning the resin under the conditions of a spinning temperature of 300° C. and a heated air of 1,000 Nm$^3$/hr/m. Furthermore, directly on the laminate web obtained above, a spunbond fiber layer having a fiber diameter of 12 μm and a basis weight of 31.3 g/m$^2$ was stacked as a back surface layer by the same method as that for the first thermoplastic resin filaments web. These layers were thermally pressure-contacted by a flat calender roll heated to 190° C. to obtain a laminate web consisting of a spunbond fiber layer/a meltblown fiber layer/a spunbond fiber layer. The obtained laminate web was then thermally pressure-contacted with a calender roll composed of an aramid fiber-made elastic roll having a Shore hardness of D90 and a metal roll heated to 245° C. by arranging the back surface layer to contact with the heated roll, immediately thereafter, rapidly cooled with a water-cooled roll, and then thermally pressure-contacted with a calender roll under the same conditions by arranging the front surface layer to contact with the heated roll, whereby the laminate web was thermally pressure-contacted from the front and back. Subsequently, a hot stretching treatment in a stretch ratio of 1% was performed between a metal roll heated to 180° C. and a metal roll heated to 130° C. to obtain a composite membrane support.

Various characteristics of the obtained composite membrane support are shown in Table 1. Also, FIGS. 4A and 4B show the distribution of air flow resistance of the obtained composite membrane support.

(Production of Porous Film)

A film-forming solution was obtained by dissolving 18 parts by weight of polysulfone (P3500, produced by Solvay) in 82 parts by weight of dimethylformamide under heating at 80° C., and filtering and defoaming the resulting solution. Subsequently, according to the wet film formation method disclosed in Japanese Unexamined Patent Publication No. 2000-042384, the film-forming solution above was coated to a thickness of 120 μm on the surface of the composite membrane support produced above of the present invention with a width of 1,016 mm and after phase separation in a solidified water at 35° C., the solvent remaining in the film was removed by washing in a water washing bath to form a porous layer having a thickness of 40 μm, whereby a 130 μm-thick support-attached polysulfone porous film was obtained. As for the characteristics of the obtained porous film, the cut-off molecular weight was 50,000 Daltons and the permeate flow rate was 7 m$^3$/m$^2$·day under 0.1 MPa.

(Production of Polyamide Composite Reverse Osmosis Membrane)

A polyamide composite reverse osmosis membrane was produced by the following procedure according to the method disclosed in Japanese Unexamined Patent Publication No. 9-253455.

An aqueous solution containing 3.0 wt % of m-phenylenediamine, 0.15 wt % of sodium laurylsulfate, 3.0 wt % of triethylamine, 6.0 wt % of camphorsulfonic acid, and 9 wt % of isopropyl alcohol was coated to a thickness of 40 μm on the support-attached polysulfone porous layer obtained above, and the excess solution was removed by a rubber blade wiper. Subsequently, the coating was contacted with an IP1016 (isoparaffin-based hydrocarbon oil, produced by Idemitsu Chemical) solution containing 0.15 wt % of trimesic acid chloride and 0.05 wt % of isopropyl alcohol for 5 seconds, then conveyed to a drying furnace at 125° C., and cured by drying for about 1 minute to form a polyamide thin-film layer, whereby a composite reverse osmosis membrane was obtained.

The flat membrane performance of the obtained composite reverse osmosis membrane was measured, as a result, the rejection ratio was 99.4% and the permeate flow rate was 2.6 m$^3$/m$^2$·day. These results are shown in Table 2 together with the evaluation of adhesive resin impregnation.

(Production of Spiral Composite Reverse Osmosis Membrane Element)

A spiral composite reverse osmosis membrane element having a length of 40 inches, a diameter of 4 inches and an effective membrane area of 7.5 m$^2$ was produced according to the method disclosed in Japanese Unexamined Patent Publication No. 2006-068644 by using the composite reverse osmosis membrane obtained above.

That is, as shown in FIGS. 3(a) and 3(b), a separation membrane unit where the composite reverse osmosis membrane having a length of 2 m was folded with the membrane surface facing inward, a feed-side channel material was inserted therebetween, a permeation-side channel material was stacked on the folded composite reverse osmosis membrane, and a urethane adhesive sealing resin was coated on three sides, was produced. Subsequently, 5 units which are the separation membrane unit produced above were stacked in the state shown in FIG. 3(c) and spirally wound around the circumference of a core tube to produce a cylindrical wound body shown in FIG. 3(a). Thereafter, for reinforcing the cylindrical wound body, the outer circumference was robed with an epoxy resin-impregnated glass fiber which was, after curing, trimmed at both ends, and finally, an anti-telescoping plate (anti-telescoping device) was attached, whereby a spiral composite reverse osmosis membrane element of the present invention shown in FIG. 3(b) was produced. The performance of the obtained composite reverse osmosis membrane element was measured, as a result, the rejection ratio was 99.6% and the permeate flow rate was 8.9 m$^3$/day. These results are shown in Table 2 together with the evaluation of adhesive resin impregnation.

Example 2

A composite membrane support was produced by the same method as in Example 1 except that the fiber diameter and basis weight of the meltblown fiber were changed to 1.7 μm and 8.2 g/m², respectively, and the spunbond basis weight on each of the front and back surface layers was changed to 31 g/m². Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 3

A composite membrane support was produced by the same method as in Example 1 except for changing the meltblown fiber diameter to 1.5 μm. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 4

A composite membrane support was produced by the same method as in Example 1 except that the fiber diameter and basis weight of the meltblown fiber were changed to 2.0 μm and 7.0 g/m², respectively. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 5

A composite membrane support was produced by the same method as in Example 2 except for changing the metal roll temperature in the calendering conditions to 248° C. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 6

A composite membrane support was produced by the same method as in Example 1 except that the fiber diameter and basis weight of the meltblown fiber were changed to 1.8 μm and 13.5 g/m², respectively, and the spunbond basis weight on each of the front and back surface layers was changed to 33.4 g/m². Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 7

A composite membrane support was produced by the same method as in Example 1 except that a hot stretching treatment between a metal roll heated to 180° C. and a metal roll heated to 130° C. was not performed. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 8

A composite membrane support was produced by the same method as in Example 1 except that the fiber diameter and basis weight of the spunbond fiber of the front surface layer (composite membrane solution coating surface) were changed to 10 μm and 26 g/m², respectively, the fiber diameter and basis weight of the meltblown fiber of the inter layer were changed to 7.3 μm and 15.0 g/m², respectively, and the fiber diameter and basis weight of the spunbond fiber of the back surface layer were changed to 14 μm and 29 g/m², respectively. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 9

A composite membrane support having a basis weight of 50 g/m² and a thickness of 55 μm was produced by the same method as in Example 1 except that the fiber diameter and basis weight of the spunbond fiber of the front surface layer (composite membrane solution coating surface) were changed to 9 μm and 22.1 g/m², respectively, the fiber diameter and basis weight of the meltblown fiber of the inter layer were changed to 1.7 μm and 5.9 g/m², respectively, and the fiber diameter and basis weight of the spunbond fiber of the back surface layer were changed to 10 μm and 22.1 g/m², respectively. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 10

A composite membrane support was produced by the same method as in Example 1 except that the fiber diameter and basis weight of the meltblown fiber of the inter layer were changed to 1.0 μm and 5.8 g/m², respectively, and the fiber diameter and basis weight of the spunbond fiber of each of the front and back surface layers were changed to 11 μm and 32.1 g/m², respectively. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 11

A composite membrane support was produced by the same method as in Example 1 except that the fiber diameter and basis weight of the spunbond fiber of the front surface layer (composite membrane solution coating surface) were changed to 10 µm and 22.5 g/m$^2$, respectively, the fiber diameter and basis weight of the meltblown fiber of the inter layer were changed to 2.1 µm and 5.9 g/m$^2$, respectively, and the fiber diameter and basis weight of the spunbond fiber of the back surface layer were changed to 10 µm and 22.0 g/m$^2$, respectively. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Example 12

A composite membrane support was produced by the same method as in Example 1 except that the fiber diameter and basis weight of the spunbond fiber of the front surface layer (composite membrane solution coating surface) were changed to 12 µm and 45.9 g/m$^2$, respectively, the fiber diameter and basis weight of the meltblown fiber of the inter layer were changed to 1.7 µm and 8.3 g/m$^2$, respectively, and the fiber diameter and basis weight of the spunbond fiber of the back surface layer were changed to 13 µm and 45.9 g/m$^2$, respectively. Using the obtained composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2.

Comparative Example 1

A three-layer laminate web consisting of a spunbond fiber layer/a meltblown fiber layer/a spunbond fiber layer was produced by the same method as in Example 1 and then subjected to calendering of thermally pressure-contacting the front and back at once by using a metal roll heated to 235° C. and a metal roll heated to 235° C., in place of calendering using an elastic roll, whereby a composite membrane support was produced. Using this composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2. FIGS. 5A and 5B show the distribution of air flow resistance of the obtained composite membrane support.

As shown in Table 1 and FIG. 5B, the air flow resistance of the obtained composite membrane support was confirmed to have a very large dispersion compared with the composite membrane support of Example 1 of the present invention shown in FIG. 4B or the later-described conventional wet process nonwoven fabric shown in FIG. 6B. As a result, in both the flat membrane performance and the element performance, the rejection ratio was about 97.0% and unsatisfactory.

In order to clarify the cause thereof, a 100 ppm aqueous solution of a blue dye Direct Blue 1 (molecular weight: 993) was passed through the element under pressure and after disassembling the element, the membrane was observed, as a result, a large number of dyed traces were confirmed on the entire membrane surface, revealing that the aqueous solution was leaked even to the support surface on the permeation side. Furthermore, the impregnation degree of the membrane element with the adhesive sealing resin was 70% and insufficient, a part of the bonded part was dyed, revealing that the feed solution was leaked to the permeated solution side through the membrane end face in the non-impregnated part with the adhesive.

The fault structure of the composite membrane in the dyed trace part was observed by an X-ray CT scanner. FIG. 7 shows the X-ray tomographic image. The porosity of the support in the defective part and the normal part as determined by image analysis are shown in Table 3. The porosity (Table 3) determined by the tomogram (FIG. 7) and image analysis suggested that in the defective part, the fault structure inside the support near the interface with the porous layer is dense compared with the normal part. Also from this, it can be said that elimination of the air flow resistance dispersion, particularly, elimination of a portion having a locally high air flow resistance, is an indispensable and necessary factor required of the support in producing a defectless composite membrane.

Comparative Example 2

A composite membrane support was produced by the same method as in Example 1 except that calendering of performing thermal pressure-contact at once between metal rolls heated to 240° C. was applied. Using this composite membrane support, a polyamide composite reverse osmosis membrane and a spiral composite reverse osmosis membrane element were produced by the same method as in Example 1.

The performances of the obtained composite membrane support, polyamide composite reverse osmosis membrane and spiral composite reverse osmosis membrane element are shown together in Tables 1 and 2. As shown in Table 1, the obtained composite membrane support was extremely bad in terms of rubbing and fiber-raising characteristics and in the performances of both the composite reverse osmosis membrane and the spiral composite osmosis membrane element produced using this composite membrane support, the rejection ratio was low and in a practically unusable level.

Comparative Example 3

A composite membrane support was produced by the same method as in Example 1 except that the spunbond basis weight of each of the front and back surface layers was changed to 35 g/m$^2$ and a meltblown fiber was not used. The obtained composite membrane support was susceptible to separation of the front or back layer, had an extremely low tensile strength of 95 N/3 cm, and could not be subjected to coating of a porous film.

Reference Example 1

Characteristics of the composite membrane support composed of a wet process paper-making nonwoven fabric, which is used in an industrially manufactured composite reverse osmosis membrane, ESPA4, produced by Nitto Denko Corporation, are shown together in Table 1, and FIGS. 6A and 6B show the distribution of air flow resistance of this composite membrane support. Also, the performances of a composite reverse osmosis membrane and a spiral composite reverse osmosis membrane element produced using this support under the same conditions as in Example 1 are shown together in Table 2.

TABLE 1

| Item Example or Comparative Example | Thermal Processing Roll | Basis Weight (g/m²) | Thickness (µm) | Air Permeability (cm³/cm²·sec) ave | Air Permeability σ | Reduced Air Flow Resistance (value converted from air permeability) (kPa·s/m) ave | Reduced Air Flow Resistance σ | Air Flow Resistance (kPa·s/m) ave | Air Flow Resistance σ | σ/ave | Tensile Strength (N/3 cm) | Number of Rubbed and Raised Fibers (fibers/m²) | Thermal-Time Constant-Load Elongation Ratio (%) |
|---|---|---|---|---|---|---|---|---|---|---|---|---|---|
| Example 1 | elastic/metal | 70 | 90 | 2.7 | 0.5 | 4.8 | 1.1 | 4.0 | 1.2 | 0.30 | 184 | 1 | 0.57 |
| Example 2 | elastic/metal | 70 | 92 | 2.1 | 0.2 | 6.1 | 0.7 | 6.4 | 2.3 | 0.36 | 208 | 0 | 0.33 |
| Example 3 | elastic/metal | 70 | 92 | 1.6 | 0.4 | 8.4 | 1.7 | 8.1 | 2.5 | 0.31 | 214 | 1 | 0.41 |
| Example 4 | elastic/metal | 70 | 96 | 3 | 0.4 | 4.3 | 0.7 | 4.2 | 2 | 0.48 | 192 | 0 | 0.69 |
| Example 5 | elastic/metal | 70 | 86 | 2.2 | 0.3 | 5.7 | 0.8 | 5.9 | 2.6 | 0.44 | 194 | 0 | 0.57 |
| Example 6 | elastic/metal | 80 | 100 | 0.5 | 0.09 | 26.9 | 4.8 | 19.0 | 6.3 | 0.33 | 218 | 0 | 0.22 |
| Example 7 | elastic/metal | 70 | 92 | 2.3 | 0.5 | 4.4 | 0.8 | 5.7 | 2.8 | 0.49 | 194 | 0 | 1.7 |
| Example 8 | elastic/metal | 70 | 90 | 3.6 | 0.84 | 3.6 | 0.8 | 3.9 | 1.5 | 0.38 | 197 | 0 | 0.51 |
| Example 9 | elastic/metal | 50 | 55 | 3.3 | 0.62 | 3.9 | 0.7 | 3.8 | 1.7 | 0.45 | 166 | 0 | 0.73 |
| Example 10 | elastic/metal | 70 | 96 | 2.1 | 0.39 | 6.4 | 1.6 | 5.9 | 2 | 0.34 | 194 | 0 | 0.43 |
| Example 11 | elastic/metal | 50 | 63 | 6 | 1.83 | 2.3 | 0.8 | 2.1 | 1.1 | 0.52 | 173 | 0 | 0.66 |
| Example 12 | elastic/metal | 100 | 120 | 1.3 | 0.21 | 9.9 | 1.6 | 9.5 | 2.9 | 0.31 | 253 | 1 | 0.31 |
| Comparative Example 1 | metal/metal | 70 | 94 | 2.1 | 0.4 | 6.1 | 1.1 | 6.9 | 4.8 | 0.70 | 228 | 1 | 0.45 |
| Comparative Example 2 | metal/metal | 70 | 92 | 2.3 | 0.4 | 5.8 | 1.3 | 6.0 | 5.2 | 0.87 | 200 | 123 | 0.43 |
| Reference Example 1 Wet process nonwoven fabric | — | 75 | 90 | 1.9 | 0.3 | 6.3 | 1.2 | 4.9 | 1.2 | 0.24 | 218 | 8 | 0.14 |

As apparent from Table 1, the composite membrane support of the present invention exhibits air flow resistance uniformity equal to that of the conventional wet process nonwoven fabric and on the other hand, thanks to a structure where a filaments having no fiber end is uniformly bonded over the entire surface, the composite membrane support of the present invention is superior to the conventional wet process nonwoven fabric in terms of easy generation of fiber-raising giving rise to Cut & Slit which is one of important defects of a composite membrane, and can be said to be a very highly reliable composite membrane support.

TABLE 2

| Item Example or Comparative Example | Thermal Processing Roll | Flat Membrane Performance 1500 ppm NaCl at 1.5 MPa, 25° C. Rejection Ratio (%) | Flat Membrane Performance Permeate Flow Rate (m³/m²·day) | Element Performance 500 ppm NaCl at 0.7 MPa, 25° C. Rejection Ratio (%) | Element Performance Permeate Flow Rate (m³/day) | Impregnation Degree with Resin (%) |
|---|---|---|---|---|---|---|
| Example 1 | elastic/metal | 99.4 | 2.6 | 99.6 | 9.3 | 98 |
| Example 2 | elastic/metal | 99.2 | 2.5 | 99.4 | 9.0 | 89 |
| Example 3 | elastic/metal | 99.3 | 2.5 | 99.4 | 8.3 | 86 |
| Example 4 | elastic/metal | 99.3 | 2.0 | 99.5 | 6.9 | 83 |
| Example 5 | elastic/metal | 99.4 | 2.2 | 99.6 | 7.8 | 97 |
| Example 6 | elastic/metal | 99.2 | 1.9 | 99.3 | 6.7 | 63 |
| Example 7 | elastic/metal | 98.9 | 2.1 | 99.1 | 10.3 | 93 |
| Example 8 | elastic/metal | 99.4 | 2.6 | 99.6 | 9.4 | 98 |
| Example 9 | elastic/metal | 99.2 | 2.3 | 99.4 | 8.3 | 99 |
| Example 10 | elastic/metal | 99.3 | 2.2 | 99.7 | 7.9 | 96 |
| Example 11 | elastic/metal | 99.4 | 2.7 | 99.5 | 9.7 | 100 |
| Example 12 | elastic/metal | 99.2 | 2.0 | 99.3 | 6.7 | 75 |
| Comparative Example 1 | metal/metal | 97.2 | 3.1 | 97.4 | 10.9 | 71 |
| Comparative Example 2 | metal/metal | 94.8 | 3.2 | 92.4 | 11.2 | 69 |
| Reference Example 1 | — | 99.3 | 2.4 | 99.6 | 8.4 | 99 |

As seen from Table 2, the polyamide composite reverse osmosis membrane and the spiral composite reverse osmosis membrane element of the present invention, produced using any composite membrane support of the present invention, exhibited excellent performances equal to those using the conventional wet process nonwoven fabric.

TABLE 3

|  | Defective Parts | Normal Parts |
|---|---|---|
| Porosity (%) | 22 to 42 | 42 to 51 (average: 49) |

INDUSTRIAL APPLICABILITY

According to the present invention, a high-performance composite membrane and a composite membrane element, having characteristics equal to those produced using a wet process nonwoven fabric, can be produced by using a dry process nonwoven fabric and a great cost down can be expected. Also, the composite membrane support of the present invention has nonconventional significantly uniform air permeability and liquid permeability despite a filaments nonwoven fabric of a laminate structure and ensures good impregnation of an element with an adhesive sealing resin and high reliability of the sealed part, so that this composite membrane support can be suitably used as a support not only in a composite film for water treatment, such as reverse osmosis membrane and nanofiltration membrane but also in a gas separation membrane, a pervaporation membrane, a vapor permeation film or the like. Furthermore, the composite membrane support of the present invention can be also used as a support of a normal microfiltration or ultrafiltration membrane.

DESCRIPTION OF REFERENCE NUMERALS

1 Composite membrane
2 Feed-side channel material
3 Permeation-side channel material
4 Adhesive
5 Core tube
6 Adhesive sealing resin
11 Sealing part at both ends
12 Sealing part on the outer circumferential side
13 Front surface spunbond fiber layer
14 Meltblown fiber layer
15 Back surface spunbond fiber layer
16 Epoxy resin-impregnated glass fiber
17 Anti-telescoping plate
R Cylindrical wound body
U Separation membrane unit

The invention claimed is:

1. A composite membrane support, which is a laminate dry process thermoplastic resin filaments nonwoven fabric comprising three or more layers containing at least a meltblown fiber layer as an interlayer and spunbond fiber layers on both sides of said interlayer, wherein the average value of air flow resistance of said composite membrane support is from 2.0 to 30.0 kPa·s/m, the ratio between the average value and the standard deviation of air flow resistance is 0.6 or less, and the thermal-time constant-load elongation ratio in the Machine direction of said composite membrane support is 1.1% or less, wherein each of the meltblown fiber and the spunbond fiber is composed of a single-component fiber, and wherein said laminate dry process thermoplastic resin filaments nonwoven fabric is prepared by a process where said there or more layers are calendared with a non-heated elastic roll having a specific hardness and a heated metal roll in two stages, one stage for one surface and another stage for another surface, and immediately after calendaring of one surface, the web is rapidly cooled.

2. The composite membrane support according to claim 1, wherein the fiber diameter of the meltblown fiber is from 0.5 to 10.0 μm.

3. The composite membrane support according to claim 1, wherein the fiber diameter of the spunbond fiber is from 5 to 20 μm.

4. The composite membrane support according to claim 1, wherein the total basis weight of the laminate dry process thermoplastic resin filaments nonwoven fabric is from 40 to 130 g/m².

5. The composite membrane support according to claim 1, wherein the thickness of the laminate dry process thermoplastic resin filaments nonwoven fabric is from 50 to 150μm.

6. The composite membrane support according to claim 1, wherein each of the meltblown fiber and the spunbond fiber is formed of a polyester-based resin.

7. The composite membrane support according to claim 6, wherein each of the meltblown fiber and the spunbond fiber is formed of polyethylene terephthalate.

8. A composite membrane obtained by forming a porous layer and a dense layer (skin layer) having a separation function, on the composite membrane support according to claim 1.

9. The composite membrane according to claim 8, wherein the porous layer is formed of a polysulfone-based material and the dense layer is formed of a polyarnide-based material.

10. A spiral composite membrane element obtained by spirally winding the composite membrane according to claim 8, a feed-side channel material and a permeation-side channel material around the outer circumferential surface of a perforated hollow tube.

11. A method for producing a composite membrane, comprising forming a porous layer on at least one surface of the composite membrane support according to claim 1, and further forming a dense layer on the surface.

\* \* \* \* \*